(12) United States Patent
Naef, III

(10) Patent No.: US 7,836,053 B2
(45) Date of Patent: Nov. 16, 2010

(54) APPARATUS AND METHODS OF IDENTIFYING POTENTIALLY SIMILAR CONTENT FOR DATA REDUCTION

(75) Inventor: Frederick E. Naef, III, Alexandria, VA (US)

(73) Assignee: Group Logic, Inc., Arlington, VA (US)

( * ) Notice: Subject to any disclaimer, the term of this patent is extended or adjusted under 35 U.S.C. 154(b) by 367 days.

(21) Appl. No.: 11/966,618

(22) Filed: Dec. 28, 2007

(65) Prior Publication Data

US 2009/0171990 A1  Jul. 2, 2009

(51) Int. Cl.
*G06F 17/30* (2006.01)

(52) U.S. Cl. .................. 707/737; 707/748; 707/754; 715/234

(58) Field of Classification Search .............. 707/104.1, 707/620, 737, 754, 758, 748, 749; 715/234
See application file for complete search history.

(56) References Cited

U.S. PATENT DOCUMENTS

| | | | | |
|---|---|---|---|---|
| 5,301,320 | A * | 4/1994 | McAtee et al. ................ 705/9 |
| 5,581,691 | A * | 12/1996 | Hsu et al. ..................... 714/15 |
| 5,857,197 | A * | 1/1999 | Mullins ............................. 1/1 |
| 6,807,632 | B1 | 10/2004 | Carpentier et al. |
| 6,928,526 | B1 | 8/2005 | Zhu et al. |
| 7,032,096 | B2 | 4/2006 | Haas et al. |
| 7,065,619 | B1 | 6/2006 | Zhu et al. |
| 7,149,729 | B2 | 12/2006 | Kaasten et al. |
| 7,149,750 | B2 * | 12/2006 | Chadwick ......................... 1/1 |
| 7,162,466 | B2 | 1/2007 | Kaasten et al. |
| 7,266,645 | B2 | 9/2007 | Garg et al. |
| 7,415,484 | B1 * | 8/2008 | Tulkoff et al. ...................... 1/1 |
| 7,590,934 | B2 * | 9/2009 | Hubert et al. ............... 715/234 |
| 2002/0129168 | A1 | 9/2002 | Kanai et al. |
| 2003/0088778 | A1 | 5/2003 | Lindqvist et al. |
| 2003/0177124 | A1 * | 9/2003 | Sauri .......................... 707/10 |
| 2003/0191828 | A1 | 10/2003 | Ramanathan et al. |
| 2004/0189707 | A1 | 9/2004 | Moore et al. |
| 2004/0193594 | A1 | 9/2004 | Moore et al. |
| 2004/0193673 | A1 | 9/2004 | Samji et al. |
| 2004/0230599 | A1 | 11/2004 | Moore et al. |
| 2005/0060643 | A1 | 3/2005 | Glass et al. |
| 2005/0076031 | A1 | 4/2005 | Xu et al. |
| 2005/0091415 | A1 | 4/2005 | Armitano |
| 2005/0154761 | A1 * | 7/2005 | Lee et al. ................. 707/104.1 |
| 2005/0216669 | A1 | 9/2005 | Zhu et al. |

(Continued)

OTHER PUBLICATIONS

Suel et al. Improved File Synchronization Techniques for Maintaining Large Replicated Collections over Slow Networks, pp. 1-12.*

(Continued)

*Primary Examiner*—Luke S. Wassum
*Assistant Examiner*—Sherief Badawi
(74) *Attorney, Agent, or Firm*—Arent Fox LLP; James J. Bindseil

(57) ABSTRACT

Apparatus and methods of identifying potentially similar content include utilizing workflow metadata to identify potential similarities in content to be processed, or between content to be processed and known content. As a result, a subset of potentially similar content is identified, and the subset can be used in data reduction operations to reduce data in the content to be processed.

44 Claims, 8 Drawing Sheets

U.S. PATENT DOCUMENTS

| | | |
|---|---|---|
| 2005/0223117 A1 | 10/2005 | Terry et al. |
| 2005/0246331 A1 | 11/2005 | De Vorchik et al. |
| 2005/0283476 A1 | 12/2005 | Kaasten et al. |
| 2006/0020646 A1 | 1/2006 | Tee et al. |
| 2006/0036568 A1 | 2/2006 | Moore et al. |
| 2006/0080308 A1 | 4/2006 | Carpentier et al. |
| 2006/0085391 A1 | 4/2006 | Turski et al. |
| 2006/0085561 A1 | 4/2006 | Manasse et al. |
| 2006/0161635 A1 | 7/2006 | Lamkin et al. |
| 2006/0184652 A1 | 8/2006 | Teodosiu et al. |
| 2006/0200466 A1 | 9/2006 | Kaasten et al. |
| 2006/0206669 A1 | 9/2006 | Zhu et al. |
| 2006/0242259 A1 | 10/2006 | Vallabh et al. |
| 2006/0265425 A1 | 11/2006 | Raff, II et al. |
| 2007/0088672 A1 | 4/2007 | Kaasten et al. |
| 2007/0174428 A1 | 7/2007 | Lev Ran et al. |
| 2007/0174486 A1 | 7/2007 | Holstege |
| 2007/0234140 A1* | 10/2007 | Lee et al. .................... 714/715 |

OTHER PUBLICATIONS

Jensen et al, Using Characteristics of Computational Science Schemas for Workflow Metadata Management, Jul. 2008, pp. 1-8.*

Jensen et al, Schema-Independent and Schema-Friendly Scientific Metadata Management, 2008, pp. 1-2.*

Boll et al, MetaXa—Context- and Content-Driven Metadata Enhancement for Personal Photo Books, 2007, pp. 1-12.*

Suel, et al. "Algorithms for Delta Compression and Remote File Synchronization." Chapter in Handbook of Lossless Compression. Academic Press, Aug. 2002, 24 pages.

Broder. "On the Resemblance and Containment of Documents" IEEE Feb. 1998, 9 pages.

Cisco Systems. "Cisco Wide Area Application Services (WAAS) Version 4.0" Technical Overview, 12 pages.

Forman, et al. "Finding Similar Files in Large Document Repositories" Proceedings of KDD'05 Aug. 21-24, 2005 and ACM 2005, 7 pages.

Manber. "Finding Similar Files in Large Document Repositories" University of Arizona and to appear in 1994 Winter USENIZ Technical Conference, 11 pages.

Muthitacharoen, et al. "A Low-Bandwidth Network File System" ACM 2001, 2 pages.

Teodosiu. "Optimizing File Replication over Limited-Bandwidth Networks Using Remote Differential Compression" Nov. 2006, 16 pages.

Sue, et al. "Improved File Synchronization Techniques for Maintaining Large Replicated Collections over Slow Networks" Proceedings of the 20th International Conference on Data Engineering and ACM 2004, 12 pages.

The Riverbed Optimization System (RiOS) v4.0. A Technical Overview, 18 pages.

Tridgell. "Efficient Alogrithms for Sorting and Synchronization" Thesis Paper for Doctorate in Philosophy at The Australian National University, submitted Feb. 1999, 115 pages.

* cited by examiner

APPARATUS AND METHODS OF IDENTIFYING POTENTIALLY SIMILAR CONTENT FOR DATA REDUCTION

BACKGROUND

1. Field

The described aspects relate to identifying potentially similar content for performing or enabling data reduction.

2. Background

Data reduction or compression techniques may be utilized to reduce the amount of data in a piece of content, such as a digital document or file, for improving the efficiency in the transfer or storage of the content. Data compression may be utilized in applications such as file transfer, file synchronization, content storage de-duplication, or any application where minimizing the size of the data is desirable.

In one specific example, data compression is utilized in the transfer of documents between two or more locations, referred to as "file transfer." Because the communications links between the locations may have low bandwidth or high latency, or both, the time it takes to transfer the documents can be significant. Alternatively, even with a fast network, the file transfer may take a long time if the files have a large size, or if many files are being sent. By utilizing data compression techniques, the amount of data that needs to be transmitted can be reduced, thus reducing the transmission time. Further, a reduction in the amount of data to be transmitted will reduce the sum total of the amount of bandwidth required for the transmission, and thus free-up bandwidth for other types of communication.

There are a number of different data compression techniques, including compressing a file based on the same data content being already known. For example, these techniques may compare data content in a single file, among a plurality of files to be transferred, and between one or more files to be transferred and a plurality of files known by the destination or otherwise known in the system. In general, the focus of the existing solutions is on calculating the "distance" or "difference" between files or documents using "document fingerprinting" with hashing algorithms applied to sections of the file or document. Further, with each document represented by a collection of "document fingerprints or hashes, then the existing solutions attempt to find similarities between the fingerprints as a way to sift through the universe of documents that are known.

However, applying hashing/fingerprinting to a large universe of documents in an efficient manner, such as in terms of CPU, memory or disk utilization and overall execution time, is infeasible in many cases, especially when working with very large documents and/or a very large number of documents, such as 1000's or 100,000's of documents, and/or when the transfer is time-critical or involves a CPU/memory constraint.

Thus, improved systems are desired for efficiently reducing the potential set of similar documents that are used as inputs to algorithms for reducing the amount of data in content to be transferred or stored.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a computer-implemented method of identifying potentially similar content for data reduction comprises receiving content workflow metadata corresponding to content to be processed, wherein the content to be processed includes a data component, and wherein the content workflow metadata represents workflow processing information corresponding to the data component. The method further comprises receiving known content workflow metadata corresponding to a first plurality of known content, wherein each known content includes a known data component, and wherein the known content workflow metadata represents workflow processing information corresponding to each respective known data component. Also, the method comprises determining a potential similarity between the data component of the content to be processed and at least one known data component of at least one of the first plurality of known content based on a similarity between the respective content workflow metadata and the respective known content workflow metadata. Additionally, the method comprises outputting an identification of potentially similar content, based on the determined potential similarity, for use in reducing data in the content to be processed.

In another aspect, a computer program product configured to identify potentially similar content for data reduction comprises a computer-readable medium comprising instructions. The computer-readable medium comprises at least one set of instructions operable to cause a computer to receive content workflow metadata corresponding to content to be processed, wherein the content to be processed includes a data component, and wherein the content workflow metadata represents workflow processing information corresponding to the data component. Further, the computer-readable medium comprises at least one set of instructions operable to cause the computer to receive known content workflow metadata corresponding to a first plurality of known contents, wherein each known content includes a known data component, and wherein the known content workflow metadata represents workflow processing information corresponding to each respective known data component. Also, the computer-readable medium comprises at least one set of instructions operable to cause the computer to determine a potential similarity between the data component of the content to be processed and at least one known data component of at least one of the first plurality of known contents based on a potential similarity between the respective content workflow metadata and the respective known content workflow metadata. Additionally, the computer-readable medium comprises at least one set of instructions operable to cause the computer to output an identification of potentially similar content, based on the determined potential similarity, for use in reducing data in the content to be processed.

In yet another aspect, at least one processor configured to identify potentially similar content for data reduction comprises a first module for receiving content workflow metadata corresponding to content to be processed, wherein the content to be processed includes a data component, and wherein the content workflow metadata represents workflow processing information corresponding to the data component. The at least one processor further comprises a second module for receiving known content workflow metadata corresponding to a first plurality of known contents, wherein each known content includes a known data component, and wherein the known content workflow metadata represents workflow processing information corresponding to each respective known data component. Also, the at least one processor comprises a third module for determining a potential similarity between the data component of the content to be processed and at least one known data component of at least one of the first plurality of known contents based on a potential similarity between the respective content workflow metadata and the respective known content workflow metadata. Additionally, the at least one processor comprises a fourth module for outputting an identification of potentially similar content, based on the determined potential similarity, for use in reducing data in the content to be processed.

In a further aspect, a computing device for identifying potentially similar content for data reduction comprises means for receiving content workflow metadata corresponding to content to be processed, wherein the content to be processed includes a data component, and wherein the content workflow metadata represents workflow processing information corresponding to the data component. Also, the computing device comprises means for receiving known content workflow metadata corresponding to a first plurality of known contents, wherein each known content includes a known data component, and wherein the known content workflow metadata represents workflow processing information corresponding to each respective known data component. Further, the computing device comprises means for determining a potential similarity between the data component of the content to be processed and at least one known data component of at least one of the first plurality of known contents based on a potential similarity between the respective content workflow metadata and the respective known content workflow metadata. Additionally, the computing device comprises means for outputting an identification of potentially similar content, based on the determined potential similarity, for use in reducing data in the content to be processed.

In yet another aspect, a computing device for identifying potentially similar content for data reduction comprises a communications module operable to receive content workflow metadata corresponding to content to be processed, wherein the content to be processed includes a data component, and wherein the content workflow metadata represents workflow processing information corresponding to the data component. Further, the communications module is operable to receive known content workflow metadata corresponding to a first plurality of known content, wherein each known content includes a known data component, and wherein the known content workflow metadata represents workflow processing information corresponding to each respective known data component. Additionally, the computing device comprises a similarity identifier module having one or more similarity rules operable to determine a potential similarity between the data component of the content to be processed and at least one known data component of at least one of the first plurality of known content based on a potential similarity between the respective content workflow metadata and the respective known content workflow metadata. Further, the similarity identifier component is operable to output an identification of potentially similar content, based on the determined potential similarity, for use in reducing data in the content to be processed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used. Further, it should be noted that such systems may be presented with a given configuration of components, but that other configurations may be utilized to accomplish the features discussed herein.

Figure 1:
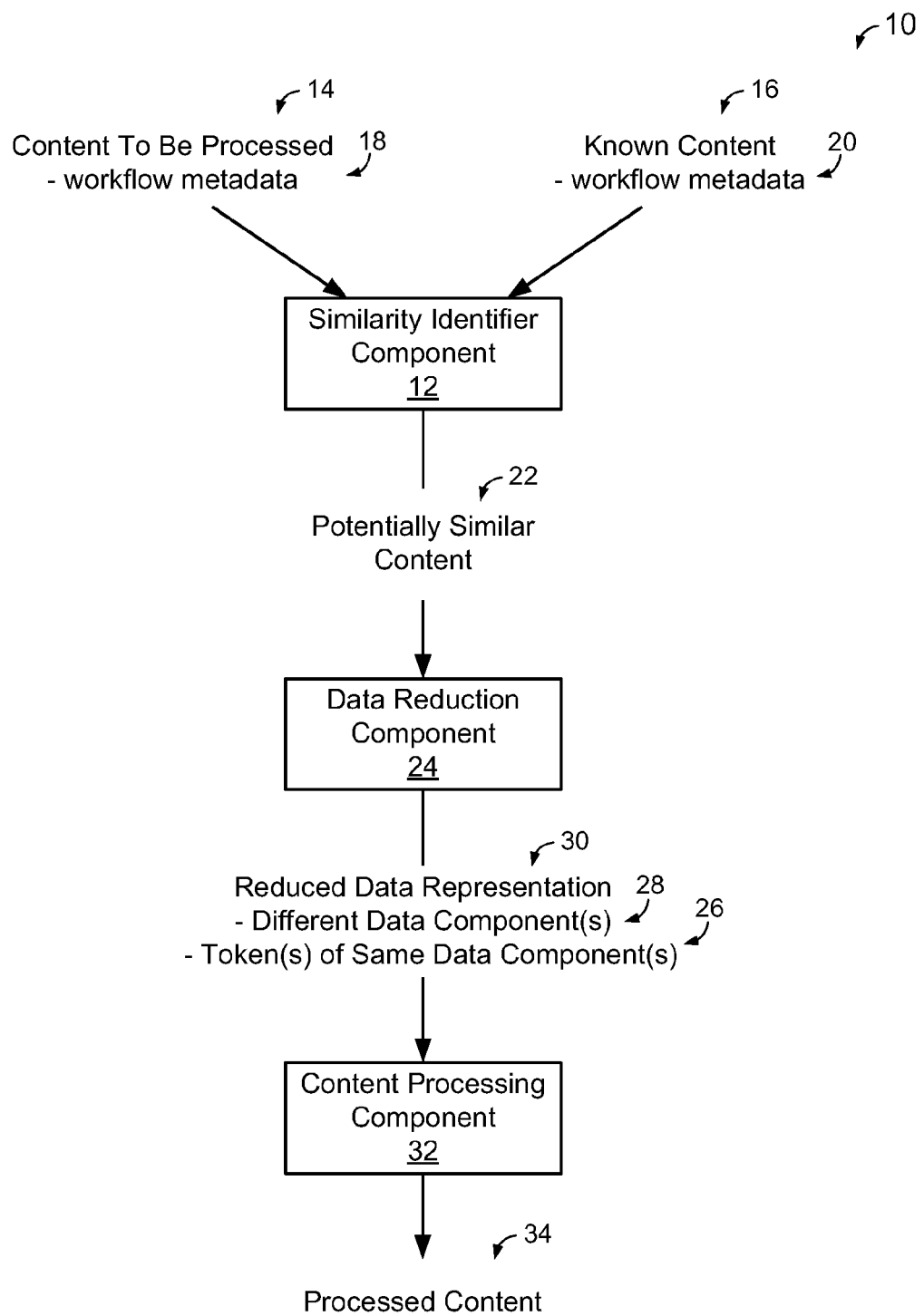
FIG. 1 is a schematic diagram of one aspect of a system for identifying potentially similar content.

Referring to FIG. 1, in one aspect, a system 10 of identifying potentially similar content for performing or enabling data reduction includes a similarity identifier component 12. Similarity identifier component 12 is operable to compare one or more content to be processed 14 with one or more known content 16, based on comparing respective workflow process metadata 18 and 20, to identify a subset of potentially similar content 22 for use by a data reduction component 24.

The content to be processed 14 may include content to be transferred, synchronized, de-duplicated, backed-up, or any other operation benefiting from reducing the data size of content associated with systems such as a workflow or job tracking system, a file transfer system, a synchronization system, a wide area file service, a file system, or an asset management system. The known content 16 may include, for example, any content known in system 10. As used herein, "known" means either the content is located "somewhere" in system 10, or the corresponding workflow metadata can be determined—e.g., in the file transfer case, the known content may actually be located somewhere else and so it is "known" to the entire system 10 but not necessarily known to both sides of the transfer. In any case, the subset of potentially similar content 22 includes a subset of the content to be processed 14 matched with a subset of the known content 16 based on the respective workflow process metadata 18 and 20. In some aspects, for example, the subset of potentially similar content 22 may be a proper subset, e.g. a number less than all, of the plurality of known content 16 and/or a proper subset of all of the content to be processed 14.

Further, similarity identifier component 12 provides data reduction component 24 with, or allows access to, the identified subset of potentially similar content 22. In turn, data reduction component 24 is operable to focus its operations on the subset of potentially similar content 22. As such, rather than having to compare the entire universe of known content 16 against all of the content to be processed 14, data reduction component 24 instead analyzes the subset of potentially similar content 22, which may be smaller in size or which has the likelihood of having data in common, thereby improving efficiency and feasibility of data reduction operations.

Data reduction component 24 identifies the same data components and/or different data components found in the subset of potentially similar content 22. The same data components found in both the subset of content to be processed and the subset of the known content comprise identical or redundant data that is already known, and thus is replaced with a token 26 having a smaller data size than the redundant data component. Further, token 26 may include information identifying a location within system 10 where the known, redundant data component may be found. On the other hand, the one or more different data components 28 found in the subset of data to be processed, when compared with the subset of known data, represent new or unknown data. As such, data reduction component 24 replaces the content to be processed 14 with a reduced data representation 30 that includes the identified one or more different data components 28, or the one or more tokens 26 representing same data components, or some combination of both. As such, reduced data representation 30 has a smaller overall data size, which may be in terms of storage space and/or network bandwidth, than the original content to be processed 14.

Content processing component 32 obtains and processes the reduced data representation 30, thereby generating processed content 34. As such, content processing component 30 may include any type of logic, such as logic operable to perform any operation on content to be processed 14. Thus, processed content 34 may include, for example, content that has been transferred, synchronized, de-duplicated, backed-up, or any other operation performable by content processing logic and benefiting from the reduced data size of the content. Additionally, it should be noted that in some aspects, one or more of similarity identifier component 12, data reduction component 24 or content processing component 32 may be implemented within the same or by different modules or by the same or by different computing devices.

Thus, similarity identifier component 12 advantageously operates, in part, to narrow down the universe of known content 16 into a subset of potentially similar content 22 for use by data reduction component 24, thereby improving efficiency and feasibility of data reduction operations. In other words, similarity identifier component 12 reduces the effort used by data reduction component 24 to find similarities, or differences, between the content under analysis by reducing the total number of content to be considered. Alternatively, in some situations similarity identifier component 12 enables the use of redundant data compression because those situations previously had environments and/or time criticality demands for operation that made the redundant data compression approach infeasible. Additionally, because the subset of potentially similar content 22 includes potentially similar workflow processing metadata 18 and 20, similarity identifier component 12 increases the likelihood of data reduction component 24 being able to identify similarities or differences and thus reduce a size of the data for the respective content to be processed 14.

Therefore, via system 10, content processing component 32 is operable to process or initiate the processing of one or more reduced data representations 30 of one or more pieces of content to be processed 14, where similarity identifier component 12 enables or increases an efficiency of data reduction component 24. In particular, similarity identifier component 12 supplies as an input or provides data reduction component 24 with access to an identity of a subset of potentially similar content 22 between the content to be processed 14 and known content 16 based on comparing respective workflow processing metadata 18 and 20. As such, data reduction component 24 is operable to efficiently reduce a size of the data for processing by eliminating one or more redundant data components prior to the processing of the content.

Figure 2:
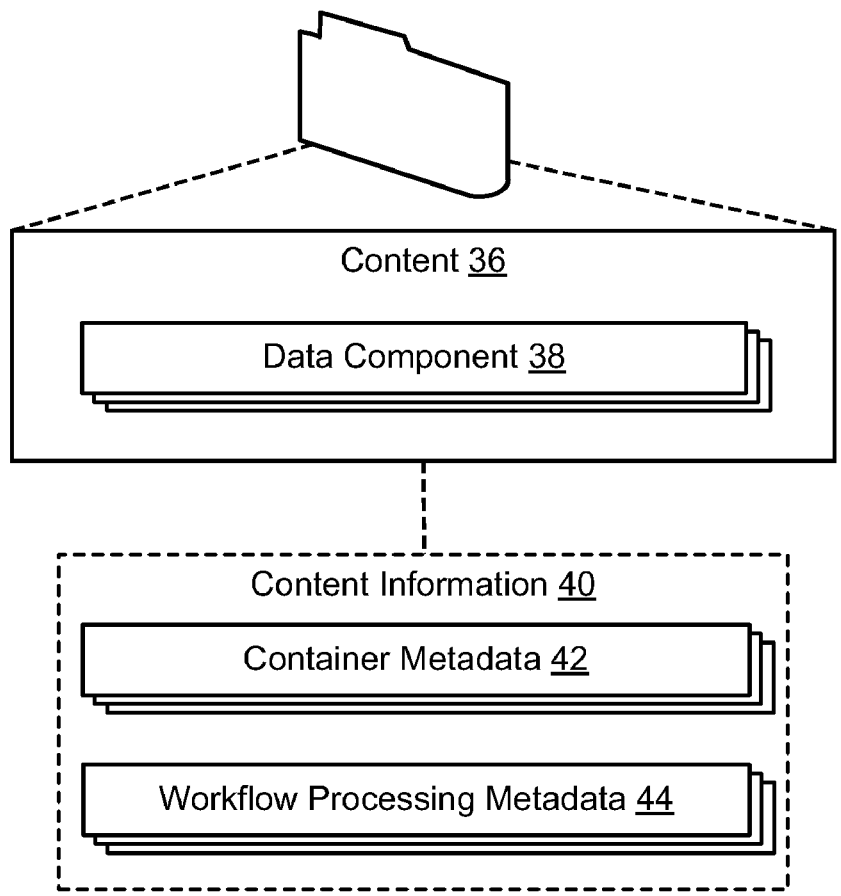
FIG. 2 is a schematic diagram of one aspect of content in the system of FIG. 1.

Referring to FIG. 2, each piece of content 36, which includes content to be processed 14 and known content 16 from FIG. 1, includes one or more data components 38 created or modified in a workflow processing of the content. Further, each piece of content 36 is associated with (as indicated by the dashed lines) or includes content information 40, which includes container metadata 42 describing the respective container holding the content, as well as workflow processing metadata 44 describing one or more workflow processing characteristics associated with one or more data components 38 of the respective content.

Each data component 38 includes any data element that makes up the respective content 36. For example, data component 38 may include one or more of text, graphics, audio, video, code, scripts, coding, and any other data that may be part of a piece of content. In one aspect, for example, one or more data components 38 may correspond to one or more digital files that make up a piece of content. Additional examples of data component 38 include one or more of raw video or audio streams of a movie, data defining a digital photograph, data defining text, data defining a font, and any other data defining at least some portion of the content.

Container metadata 42 includes information describing basic attributes of the container or file itself, as opposed to attributes of the data that forms or defines the content. For example, container metadata 42 may include, but is not limited to, one or any combination of a content name or identifier, a position in the respective content or file system, a content file extension describing the format of the content or type of the file, a date/time of creation, a date/time of modification, a creator identification, etc. For example, when the container is a file, these attributes may be called "metadata about the file," which describe the container in general but which do not describe the data elements within the container. As such, these attributes are generally not sufficient for finding larger relationships between content/files/job components.

On the other hand, workflow processing metadata 44 relates to or describes at least one data component 38 of the respective content 36. For example, workflow processing metadata 44 may include, but is not limited to, any data that identifies or describes a workflow process associated with or application to a respective data component, an identification or description of a data component, an identification or description of a data component type, information relating to a workflow process to be applied to a component(s), information relating to workflow process/steps that have been applied to a component(s), information defining an association of the content to a particular type of workflow, including how the association is structured, information defining an association of a data component in a workflow to other data components in the workflow, or other types of related workflows, characteristics of the content being described by the workflow (e.g., for photography, the type of camera used, metadata about the photoshoot, job, etc.), identification/description of the data component including classification of the data component relative to some workflow-specific classification system, identification/description of the type and make-up of the data component, or any other data describing the data component and/or its relationship to a workflow process.

For example, workflow processing metadata 44 includes workflow processing metadata 18 of content to be processed 14 and workflow processing metadata 20 of known content 16. The workflow processing of content 36 may correspond to a single workflow, or may be one of a plurality of inter-related sub-workflows, either on content 36 or on other content or both, corresponding to one or more other sub-workflows or one or more other main workflows, or both. For example, the main workflow may correspond to a respective job or overall product of the workflow processing, such that the workflow processing metadata 44 may be used to identify a respective data component as being a part of the respective job or overall product, as well as to the specific sub-workflow that has or will operate on the respective data component.

In one aspect, for example, workflow processing metadata 44 may include Extensible Metadata Platform (XMP) type data, as defined by Adobe Systems, Inc. XMP metadata defines the history of a file as it is modified through a series of workflow steps, but can also be extended to include information such as job membership, which indicates how the respective data component or content relates to other data components or other contents, or other properties, such as workflow processing characteristics of the respective data component, or other custom extended metadata that is workflow-specific and can be used to identify data components or contents that are related or descendants of one another, etc. XMP allows each software program or device in the workflow process to add its own information to a digital resource, which can then be retained in the final digital file. In another aspect, for example, workflow processing metadata 44 may include the eXtensible Access Method (XAM) type data, as defined by the Storage Networking Industry Association. XAM is an emerging standard that allows files in a file store to be annotated with metadata, such as job membership in this case. In yet another aspect, for example, workflow processing metadata 28 may include the Job Definition Format (JDF) type data. JDF is a standard for defining digital workflows in the graphics arts industry. JDF may be used to define how a file component relates to a larger job and the processing that needs to be, or has been, applied to the file. For example, JDF enables each "node," or content processing component in this case, to determine what files it needs as input and where they are found, and what processes to perform on the file. The node or content processing component then modifies the JDF job ticket to describe what it has done, and examines the JDF job ticket to determine where the message and accompanying files should be sent next. As such, the JDF job ticket may comprise the workflow processing metadata 44 in this case. In another aspect, for example, workflow processing metadata 44 may include the Material eXchange Format (MXF) type data, which is a container format for professional digital video and audio media defined by a set of Society of Motion Picture and Television Engineers (SMPTE) standards. MXF is a "container" or "wrapper" format that supports a number of different streams of coded "essence," encoded with any of a variety of codecs, together with a metadata wrapper which describes the material contained within the MXF file. These are examples only—various industries have their own metadata definitions for workflow. Accordingly, workflow processing metadata 28 is not limited to these examples, but may include any type or any combination of types of data relating to workflow processing of data components or content.

Further, content information 40, and in particular workflow processing metadata 44, can be related to the respective content 36 in a number of ways: embedded in the content (i.e., an XMP-blob embedded in an Adobe Portable Document Format (PDF) document), which can be extracted using a programming toolkit or other mechanism; in a group of files including the content, wherein one file includes the metadata and the other files include supporting files or resources, where the group of files includes a linkage, as such the metadata file may be updated as work is performed on the content; attached to the file as an extended attribute, for example, on the Windows NTFS file system the metadata can be attached as an alternative data stream so that it does not modify the actual file but goes along with the file as the file is processed; stored with the file (for example, in a secondary file such as a "._<filename>" file similar to how the Mac OS X SMB Client stores file; stored as a record in a central repository, such as an asset management system or workflow/job tracking system that can relate an identifier in the file (file index, path, hash fingerprint, etc.) to a record in the system. In other words, workflow processing metadata 44 may be stored within the content, linked to the content, or stored separately from the content. In any case, system 10 includes the ability of similarity identifier component 12 (FIG. 1) to access the respective workflow processing metadata 44.

Figure 3:
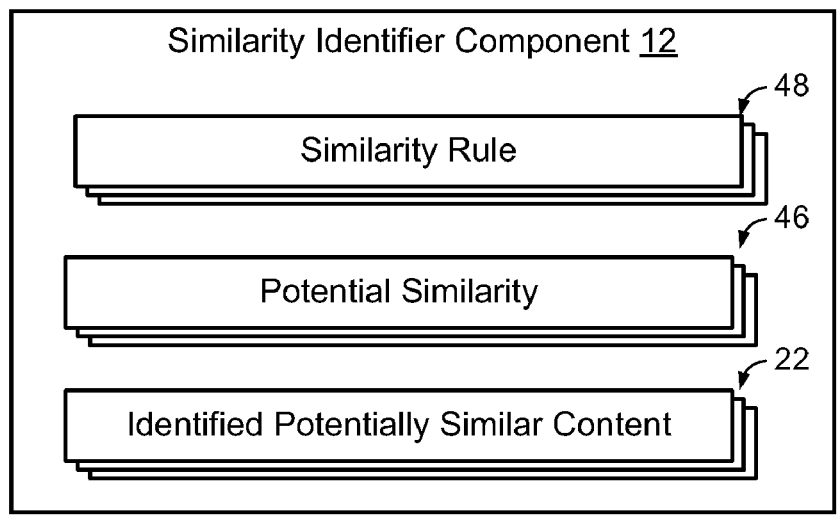
FIG. 3 is a schematic diagram of one aspect of a similarity identifier component of the system of FIG. 1.

Referring to FIG. 3, similarity identifier component 12 is operable to identify potentially similar content 22 based on workflow processing metadata 44. In one aspect, for example, similarity identifier component 12 may be operable to compare the respective workflow processing metadata 18 (FIG. 1) of the respective content to be processed 14 (FIG. 1) with the respective workflow processing metadata 20 (FIG. 1) of the respective known content 16 (FIG. 1) to determine a potential similarity 46 between the two. In particular, in some aspects, similarity identifier component 12 is operable to determine a potential similarity between the data component of the file to be processed and at least one known data component of at least one of the first plurality of known files based on a similarity between the respective file workflow metadata and the respective known file workflow metadata. As such, the subset of potentially similar content 22 may be based on the determined potential similarity 46.

For example, workflow processing metadata 44 of content to be processed 14 may include information that identifies a data component as a photograph, and as being associated with a specific project or job identifier. In this case, similarity identifier component 12 may be able to find all other photographs that are known in system 10, or that have been previously transferred from or received by the source of content to be processed 14, that have workflow processing metadata that matches the respective project or job identifier. As such, similarity identifier component 12 identifies potentially similar content 22 (FIG. 1) as being the respective data component or the entire piece of the respective content to be processed and the respective data component or the entire piece of the respective known content having the matching project or job identifier. In this case, potential similarity 46 may be represented by the existence of the matching project or job identifier. Alternately, in other aspects, potential similarity 46 may be represented by a count of how many matching metadata components are found. As such, potential similarity 46 may include, for example, any indicator, such as any value representative, of a potential for having a same (e.g. identical) component.

Further, for example, similarity identifier component 12 may include one or more similarity rules 48 to determine potential similarity 46 between one or more of the plurality of known content 16 and one or more of content to be processed 14. In some aspects, a respective similarity rule 48 used by similarity identifier component 12 may be workflow-specific, e.g. the rule may depend on a type of the workflow associated with the respective content to be processed 14 since the workflow processing metadata standards, as noted above, can be workflow-specific or industry-specific. For example, the items of the JDF metadata that can indicate similarity in a print graphics art workflow may different from workflow metadata corresponding to video production. Additionally, users of system 10 may define custom workflow processing metadata, such as a job number or an account number, which could be used to determine similarity. As such, a respective similarity rule 48 may be customized or specifically defined based on the respective application.

Further, in one aspect, one or more of similarity rules 48 include configurable protocols to determine potential similarity 46, as well as including one or more configurable similarity thresholds that classify potential similarity 46, such as one or more values or ranges of values of determined potential similarity 46 that correspond to one or more levels of potentially similar content 22.

Additionally, it should be noted that similarity identifier component 12 may be utilized at any time during any of the processing of system 10.

In one example, which should not be construed as limiting, content to be transferred 14 and known content 16 may include a collection of PDF files that represent advertisements to be inserted into a magazine. While the file names may be different, these advertisements may have workflow specific metadata associated with them that allow similarity identifier component 12 to determine, for example, that they are part of the same account number, or the same content but translated into different languages, or similar images but different messaging. Each of these determinations is based on the workflow specific metadata. Once similarity identifier component 12 makes this determination, similarity identifier component 12 can conclude that these files are likely to be similar, and thus can identify them as potentially similar content 22. Correspondingly, data reduction component 24 can access the respective identified potentially similar content 22 and apply the differencing/compression protocol to generate reduced data representation 30.

In an alternative example, content to be transferred 14 may be part of a magazine that contains multiple components within it. Similarity identifier component 12 can determine that those components may be similar to other known components that are included in the magazine or that are included in another issue of the magazine that is being processed by using the workflow specific metadata to determine potential similarities.

Further, in another non-limiting example, in the case of a de-duplication scenario of an asset management system having an unwieldy universe of documents, similarity identifier component 12 operates to determine that there is a small subset of potentially similar documents already archived against which data reduction component 24 should attempt to apply differencing compression.

Figure 4:
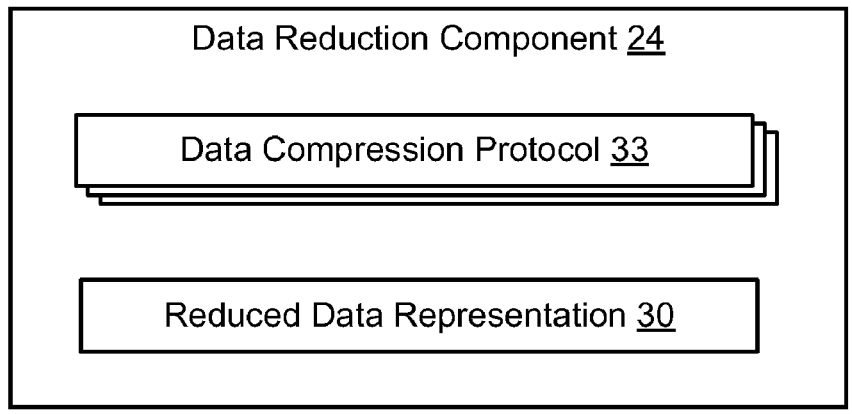
FIG. 4 is a schematic diagram of one aspect of a data reduction component of the system of FIG. 1.

Referring to FIG. 4, in order to increase the efficiency of processing one or more pieces of content 14, such as in a file transfer, file synchronization or file back-up or de-duplication process, data reduction component 24 operates on one or more pieces of content to be processed 14 to minimize an amount of data representing the respective content.

In one aspect, for example, data reduction component 24 eliminates redundancy in one or more pieces of content to be processed 14 based on determining one or more same data components or different data components, or both, between content to be processed 14 and other known content 16 in system 10. Known content 16 may include, but is not limited to, types of content such as content previously stored in a database or archived in a file server, content previously retrieved, content previously transmitted, content previously received, or the one or more pieces of content to be processed 14. In this regard, for example, system 10 may include one or any combination databases and/or storage mechanisms operable to store known content 16.

Further, in an aspect, data reduction component 24 may include one or more data compression protocols 33, which eliminate the redundancy associated with one or more of the respective data components 38 of the respective content to be processed 14. It should be noted that many data compression protocols 33 may be operable with the described aspects, with the one or more selected protocols being a user decision based on the particular data reduction scenario.

In one example of a use case involving a file transfer, for example, which should not be construed as limiting, data reduction component 24 may utilize one or more data compression protocols operable to identify similarities or differences (a) within a file, (b) between files that are being transferred, or (c) between files that have been previously transferred. For example, techniques for (a) include LZW (dictionary) compression, techniques for (b) include delta compression like the Unix diff command, and techniques for (c) include remote file synchronization or remote differential compression, similar to the Unix rsync program. It should be noted, however, that other techniques may be utilized, and the present disclosure is not to be limited to the techniques listed in this example.

In an aspect, in order to determine the existence of redundant information, data reduction component 24 or the respective data compression protocol 33 may represent one or more portions of each piece of content to be processed 14 and one or more portions of each piece of known content 16 with a hash, a fingerprint, a signature, etc., and then determine a distance, e.g. a similarity or a difference, between the respective portions of the content based on comparing the respective hashes, fingerprints, signatures, etc. One of the challenges faced by data reduction component 24, however, is applying such data reduction protocols to a large universe of content in an efficient manner with respect to one or a combination of processor usage, memory usage, file system utilization, network/bandwidth utilization, etc. In many cases, such protocols become infeasible or sub-optimal, especially when content having a very large size, or very large number of content, such as 1000s or 100,000s of potentially very large pieces of content, or both, are being processed, e.g. transmitted or stored, over a period of time, or when the processing has a time critical constraint, and/or a processing or memory constraint. In other words, the required comparison of signatures performed by data reduction component 24 or data compression protocol 33 may be so large that it takes an unacceptable amount of usage of one or more of time, memory, network/bandwidth, or processing resource to achieve a result. Advantageously, system 10 includes similarity identifier component 12 to reduce the burden on data reduction component 24, and in some cases to actually make data reduction feasible.

As such, using the identified potentially similar content 22 (FIG. 1), data reduction component 24 is operable to identify and/or generate one or more reduced data representations 30 corresponding to the one or more content to be processed 14. For example, in one aspect, reduced data representation 30 represents all or some portion of content to be processed 14, where reduced data component has a smaller data size than the original content 14 based on removing redundant data. In one case, for example, reduced data representation 30 includes one or more tokens 26 each representing an already known data component. In one aspect, for example, token 26 may be a pointer to a location of the respective data component within the system 10 or at the destination of the processing activity, and may further indicate a relationship to one or more of the original data components or to the original content to be processed 14. In another case, for example, reduced data representation 30 may include only different data components 28 identified between content to be processed 14 and known content 16. For example, in a case where the content to be processed includes a plurality of digital files to be transferred, reduced data representation 30 may only or may primarily include new data components not previously known or available to the destination. In another aspect, reduced data representation 30 includes new, unknown or different data 30 combined with one or more tokens 26 representing known data. Thus reduced data representation 30 has a memory size less than a memory size of the original content to be processed 14.

Further, it should be noted that data reduction component 24 may be utilized at any time during any of the processing of system 10 (FIG. 1). For example, besides analyzing content to be processed and a subset of known content having potential similarities therewith, data reduction component 24 may also first analyze the content to be processed 14. For example, if system 10 includes a plurality of content to be processed 14, data reduction component 24 may execute to find same data components or different data components among the plurality of content to be processed 14 to generate a reduced data set of content to be processed. As such, the reduced data set of content to be processed may be operated on by similarity identifier component 12 (FIG. 1) to avoid redundancies in the operation of finding potential similarities with other known content 16.

Figure 5:
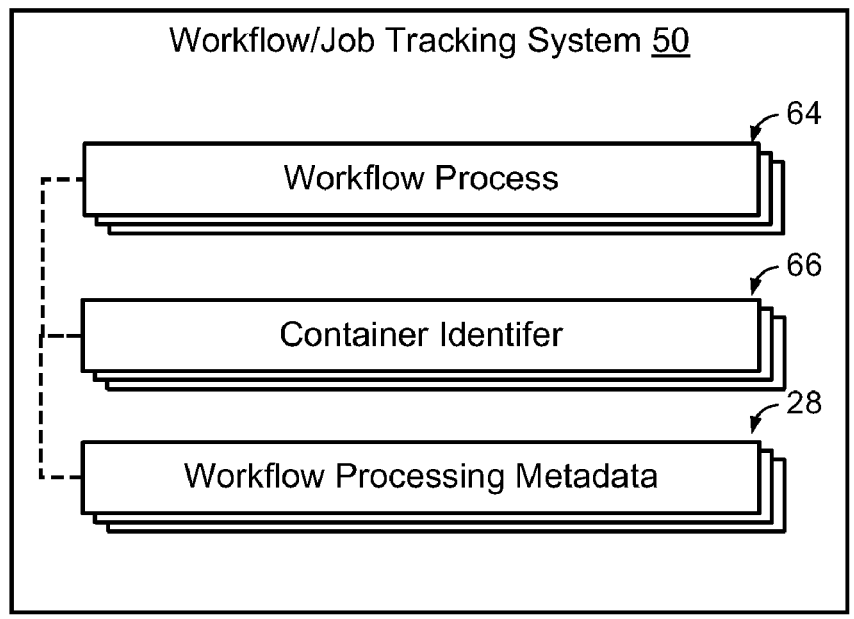
FIG. 5 is a schematic diagram of one aspect of an optional workflow/job tracking system of the system of FIG. 1.

Referring FIG. 5, system 10 (FIG. 1) may optionally include a workflow/job tracking system 50 to manage and track the workflow processing of one or more pieces of content or files. For example, in one aspect, workflow/job tracking system 50 may include one or more workflow processes or jobs 64, which each define one or more processes for one or more pieces of content or files. Further, workflow/job tracking system 50 may include a container identifier 66, which includes, for example, a name or number that uniquely identifies a piece of content, for each piece of content associated with each workflow process/job 64. For example, in one aspect, container identifier 66 may correspond to all or a portion of container metadata 42 (FIG. 2). Additionally, workflow/job tracking system 50 includes workflow processing metadata 44, which defines a status of the processing of the content associated with each workflow process/job 64. Workflow/job tracking system 50 maintains the relationships between one or more workflow processes or jobs 64, container identifiers 66 and the corresponding workflow processing metadata 44, thereby enabling management of the processing performed, and tracking the status of processing, on each piece of content 14 associated with each workflow process/job 64.

Figure 6:
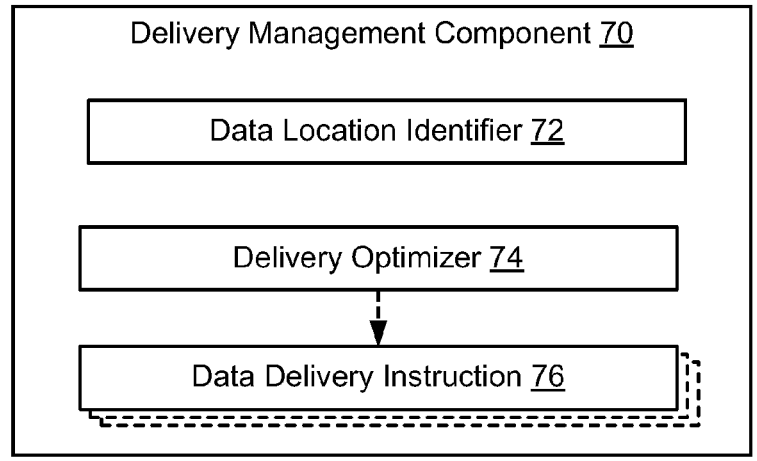
FIG. 6 is a schematic diagram of one aspect of an optional delivery management component of the system of FIG. 1.

In another optional aspect, referring to FIG. 6, system 10 may also include a delivery management component 70 operable to optimize the delivery of data corresponding to the respective content to be processed 14. In particular, delivery management component 70 may be called when content processing component 32 initiates or involves the exchange of data corresponding to content to be processed 14, such as in a file transfer of the content to be processed 14. For example, in a desired file transfer of content to be processed 14 or reduced data representation 30 from a source to one or more destinations, delivery management component 70 may execute a data location identifier 72 to determine if one or more of the respective data components involved in the file transfer may be found at any other alternative locations within system 10, such as at another network-based server or storage device. Further, delivery management component 70 may then execute a delivery optimizer module 74 to determine a delivery efficiency for transmitting the respective data component from the identified alternate data location to the destination. The delivery efficiency may include, but is note limited to, a measure of bandwidth or throughput capacity or availability, delivery time, or both, or any measure relating to delivery of data to a destination. Further, delivery optimizer module 74 includes path optimization logic operable to compare the available delivery options for transferring the data represented by content to be processed 14 or reduced data representation 30 to the desired one or more destinations. In particular, delivery optimizer module 74 may analyze the available bandwidth or throughput, and/or the estimated delivery time associated with each discovered path between an alternate data source for one or more respective data components and the respective destination, and then generate data delivery instructions 76 for one or more of the data components associated with content to be processed 14 or reduced data representation 30 to transfer one or more respective data components to the respective destination in the most efficient manner, e.g. based on the most efficient delivery efficiency for each data component. For example, if any portion of content to be processed 14 or reduced data representation 30 may be found at one or more network-based servers or storage devices having a more efficient path to the destination than the original source, then a data size of content to be processed 14 or reduced data representation 30 may be decreased even further by removing that data component, thereby improving the efficiency of delivery of the remaining portion of content to be processed 14 or reduced data representation 30 from the original source to the destination. Further, delivery management component 70 allows each data component involved in a file transfer to be delivery in the most efficient fashion. In other words, each destination may obtain various parts of content to be processed 14 or reduced data representation 30 from various locations within system 10, wherein a delivery efficiency between the respective location and the respective destination is optimized to minimize the overall bandwidth usage or transfer time, or both, associated with obtaining of content to be processed 14 or reduced data representation 30 by the respective destination.

For example, in the case of transferring a file from one location to another location in a different continent, the network used to deliver the file has a bandwidth/latency constraint that means it will take time to deliver the file across the relatively large distance. However, similarity identification component 12 can determine that a similar file was previously delivered to another location on that same remote continent. Data reduction component 24 can identify one or more respective data components 38 that are identical, and generate reduced data component 30 including one or more tokens 26 and one or more different data components 28. As such, delivery management component 70 can determine whether each of the one or more tokens 26 and/or each of the one or more different data components 28 are located elsewhere within system 10, such as a location on that same remote continent. Further, delivery management component 70 can coordinate with the destination to obtain the respective tokens 26 and/or respective different data components 28 from a respective "closest" location, where each closest location minimizes the time it takes for the destination to obtain the respective information. For example, one such closest location may be a location on the same continent that does not have the same bandwidth constraints. Thus, delivery management component 70 optimizes the overall transfer of the file to the destination, utilizing workflow metadata to determine the potential for similarities of the "different" data components with data components already delivered to another location closer to the destination.

Additionally, it should be noted that delivery management component 70 may be resident at any computing device within system 10. For example, in one aspect, delivery management component 70 may be incorporated into a server that also operates data reduction component 24 and similarity identifier component 12.

Figure 7:
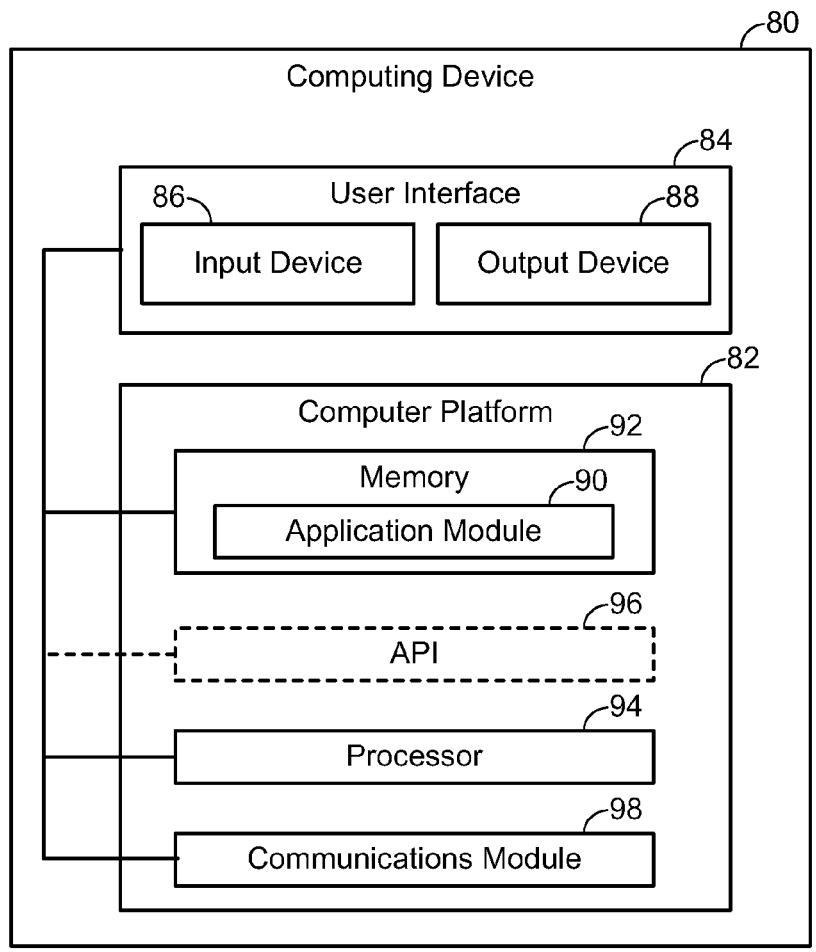
FIG. 7 is a schematic diagram of one aspect of a computing device of the system of FIG. 1.

Referring to FIG. 7, each of the computing devices or components of system 10 may generally take the form of or be included in a device such as computing device 80. Computing device 80 may include any type of computer, user terminal, workstation, etc. Further, computing device 80 may include a user interface 82 operable to enable interaction with one or more components of a computer platform 84 resident on the device. It should be noted, however, that computing device 80 may not include user interface 82, but instead the operation of computing device 80 may be defined by configuration files, workflow rules, etc. stored in the computing device.

User interface 82 may include an input device 86 operable to generate and/or receive an input into the device, and an output device 88 operable to generate and/or present information for consumption by a user of the device. For example, input device 86 may include at least one device such as a keypad and/or keyboard, a mouse, a touch-screen display, a microphone in association with a voice recognition module, etc. Further, for example, output device 88 may include a display, an audio speaker, a haptic feedback mechanism, etc. Output device 88 may generate a graphical user interface, a sound, a feeling such as a vibration, etc.

Further, computer platform 84 is operable to execute one or more application modules 90 to provide functionality to the device. For example, each application module 90 may include data and/or logic corresponding to one or more of the functionalities described herein, including one or more of data processing component 32, data reduction component 24, similarity identifier component 12, or delivery management component 70. Additionally, application module 90 may include MASSTRANSIT logic, as described below.

Further, computer platform 84 may include memory 92 for storing data and applications. For example, memory 92 may include one or more of volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 92 may include active memory and storage memory, including an electronic file system and any secondary and/or tertiary storage device, such as magnetic media, optical media, tape, soft and/or hard disk, and removable memory components.

Further, computer platform 84 may also include processor 94, which may be an application-specific integrated circuit (ASIC), or other chipset, processor, logic circuit, or other data processing device.

Further, processor 94 or other logic such as ASIC, may execute an application programming interface (API) layer 96 that interfaces with any resident software components or client applications, such as application module 90 in memory 92. API 96 may be a runtime environment executing on the respective computing device.

Computer platform 84 may further include a communications module 98, which enables communications among the various components of computing device 80, and between computing device 80 and any other communication devices via a shared communications pathway, such as any of networks 54, 56 and/or 58 (FIG. 1). Communications module 98 may be embodied in hardware, firmware, software and/or combinations thereof, and may further include all protocols for use in intra-device and inter-device communications.

For example, in one aspect, communications module 98 is operable to receive content workflow metadata corresponding to content to be processed, wherein the content to be processed includes a data component, and wherein the content workflow metadata represents workflow processing information corresponding to the data component. Additionally, communications module 98 is further operable to receive known content workflow metadata corresponding to a first plurality of known content, wherein each known content includes a known data component, and wherein the known content workflow metadata represents workflow processing information corresponding to each respective known data component. Also, communications module 98 is further operable to transmit or receive the reduced data representation.

Figure 8:
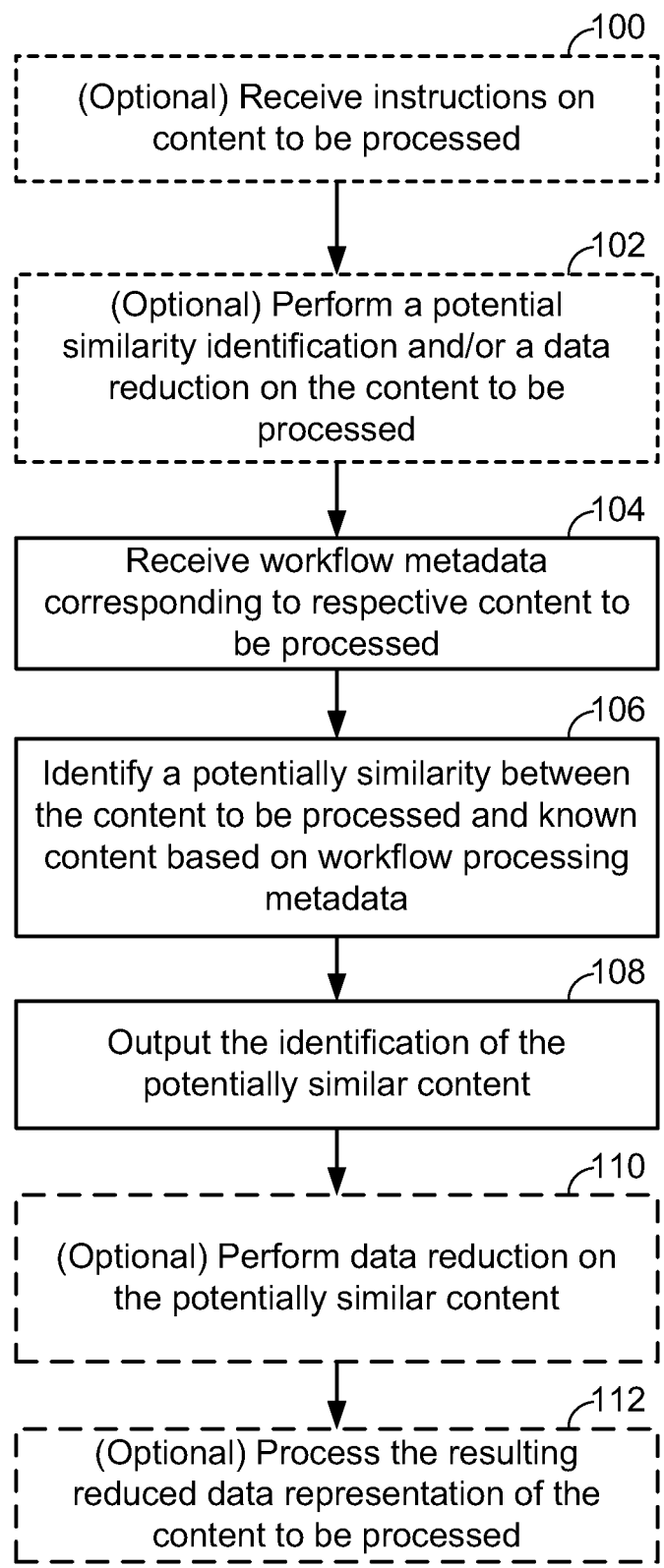
FIG. 8 is a flowchart of one aspect of a method of identifying potentially similar content for data reduction.

Referring to FIG. 8, in one aspect that should not be construed as limiting, a method of identifying potentially similar content for data reduction may optionally include receiving instructions on content to be processed (Block 100). The instructions may include receiving an identification of the content to be processed, as well as instructions on what process or processes to be performed on the file. For example, the instructions may include details on performing a file transfer, a file back-up, a database de-duplication, a file synchronization, etc.

The method may also optionally include performing a potential similarity identification and/or a data reduction on the content to be processed (Block 102). In the case of a plurality of content to be processed, the data reduction operation may identify the same or identical data components and/or different data components between the respective content to be processed in order to reduce a data size of the content and thereby increase the efficiency of the subsequent processing operation. In some further optional aspects, the data reduction operation may further involve breaking down the content to be processed into a smaller subset of content to be processed based on potential similarities between the respective content according to the corresponding workflow processing metadata associated with the respective content to be processed. Additionally, it should be noted that the method may only include the action of Block 102, and the other described actions may be optional.

Further, the method includes receiving content workflow metadata corresponding to respective content to be processed (Block 104). The content workflow metadata is associated with the processing of the respective content within a workflow process or job, which may be managed or tracked by a workflow/job tracking system. The content workflow metadata may be requested or accessed from the workflow/job tracking system, or may be accessed from another server or storage device holding the data, or may be embedded within or otherwise linked to the content to be processed.

The method additionally includes identifying a potential similarity between the content to be processed and known content based on content workflow metadata (Block 106). The potential similarity defines a possibility of similar data components existing between the content to be processed and one or more of a plurality of known contents within the system. Further, this action utilizes content workflow processing metadata as a filter to quickly sort through a possibly large number of possibly large size contents, thereby developing a more manageable list of candidate contents having a potential to have similarities with one or more of the content to be processed. Such filtering may be especially powerful in a content workflow environment, where workflow processes may tend to lead to other relationships between contents or data components of contents. As a result of this action, the universe of known contents can be reduced to a subset of a lesser number of the plurality known contents that potentially match with a subset of the content to be processed, thereby improving efficiencies in later operations designed to find similarities or differences between the two groups of content.

The method further includes outputting the identification of the potentially similar content for use in reducing the data content of the content to be processed (Block 108). In some aspects, the potential similarity may be output as an identification of the subset of the plurality of known contents having a determined similarity with the content to be processed according to analysis of the respective content workflow metadata. In other aspects, outputting the potential similarity may be output as an identification of corresponding data components having a similarity or a likelihood of a similarity. In yet other aspect, outputting the determined potential similarity may include outputting an identification or representation of the reduced data component. In still other aspects, outputting the determined potential similarity may include outputting an identification of at least one of a similar data component or a different data component, thereby allowing determination of a reduced data component.

Optionally, the method may further include performing a data reduction between one or more contents to be processed and the potentially similar contents (Block 110). The data reduction may include using one or more data compression protocols to eliminate redundant data in one or more contents to be processed, where the redundant data is already part of one or more known contents. In other words, the data reduction involves reducing a data size of the one or more contents to be processed by eliminating data components that are the same as known data component or replacing them with representative information having a substantially smaller data size.

Optionally, the method may additionally include processing the resulting reduced data representation of the content to be processed (Block 112). The processing may include a content transfer, a data synchronization, a database de-duplication or any other type of activity where reducing a data size of the respective content would result in an increase in efficiency of operation.

Additionally, when dealing with a large number contents to be processed, for example hundreds of files, and/or where such contents have a relatively large size, for example including but not limited to a size greater than 50 MB, it should be noted that the above method may include one or both of the content similarity based on workflow metadata determination and the data reduction activity prior to comparison with known documents and subsequent data reduction and other optional processing activities.

Figure 9:
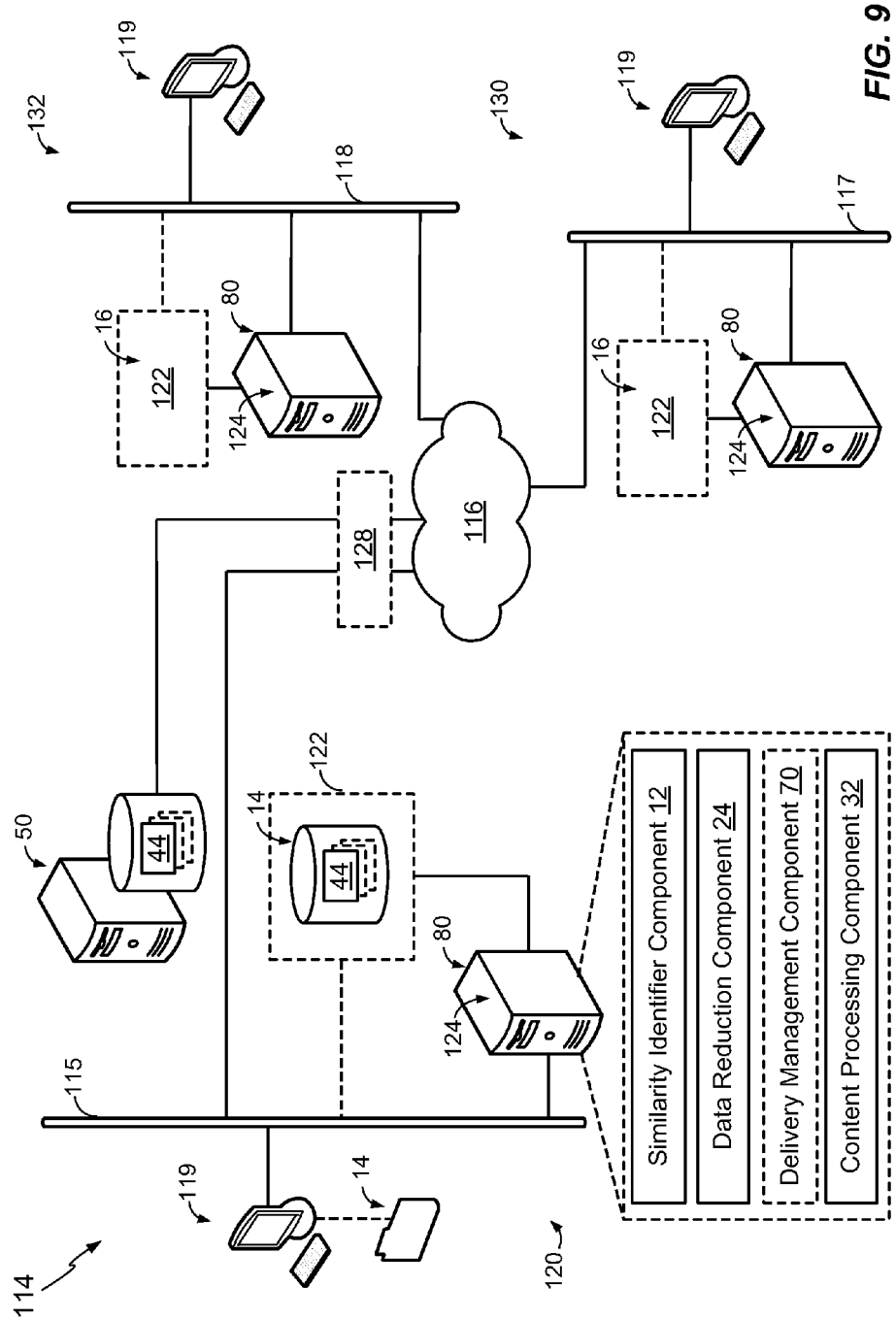
FIG. 9 is a schematic diagram of one aspect of a file transfer environment for use with the system of FIG. 1.

Referring to FIG. 9, in one sample use case, which should not be construed as limiting, the apparatus and methods discussed herein may be utilized in a file transfer environment 114. In particular, a source node 120 and a destination node 130 and/or 132 may include one or more computing devices, such as computing device 80, which include file transfer logic 124 that may be executed to effect a transfer of one or more files from source node 120 to one or more destination nodes 130 and/or 132. For example, content processing component 32 at source node 120 may transfer one or more content to be processed 14 to one or more computing device(s) 80 and/or content processing component 32 (not shown) at destination node 130 and/or 132. In one aspect, the file transfer logic 124 may include the MASSTRANSIT advanced file transfer and remote workflow software solution available from Group Logic, Incorporated of Arlington, Va. With reference to FIG. 1, for example, content processing component 34 may include file transfer logic 124.

The MASSTRANSIT solution includes a file transfer engine that runs on source node 120 and destination node 130 and/or 132. Further, the MASSTRANSIT solution may include a corresponding file database or file system 122 that tracks file transfer activity, including one or more of: files that need to be sent, files that are being sent, files previously sent, files being received, or files previously received. The file database 122 includes information about each respective file, such as a file identifier, and a pointer to the location of the file in the system. For example, the file may be stored at any repository associated with the system. Additionally, the system includes file workflow metadata 44 corresponding to the files. The file workflow metadata 44 may be stored locally by the MASSTRANSIT file database 122, and/or at another file server connected thereto (not shown), and/or in a database of a connected workflow/job tracking system 50, and/or embedded within or otherwise linked to the files. Prior to the present solution, data compression techniques would need to be performed on each of the files to be transferred, and on each of the other known files 16 in the system, for example to obtain a fingerprint of all or some portion of each file, and then all of such fingerprints would need to be compared to determine matching data content. Advantageously, the MASSTRANSIT solution is operable to utilize the workflow metadata 44 of the files to be transferred 14 to reduce the number of known files 16 to a smaller number of known files potentially similar to respective ones of the files to be transferred. As such, the data compression operations can be scaled down to be performed on the identified potentially similar known files, and also can be scaled down to be performed on the corresponding ones of the files to be transferred rather than on all of the files to be transferred. Thus, efficiencies are gained by reducing one or more of the memory usage, the processing usage, the network traffic, the usage of file system bandwidth, etc., in order to determine matching data, as the data reduction operation can focus on the identified potentially similar known files, which is a subset of all of the known files, and the corresponding potentially similar ones of the files to be transferred, which may be a subset of all of the files to be transferred.

Additionally, in the aspect of FIG. 9, the devices and components of environment 114 may communicate via wired or wireless connections to one or more communication networks 115, 116, 117 and/or 118. For example, communication networks 115, 116, 117 and/or 118 may include one or more of a local area network (LAN), a wide area networks (WAN), an enterprise network, a private network, a public network such as the Internet, or any other type of network operable to communicate information.

Further, in some aspects, content processing component 32 may be further associated with a user terminal 119 for carrying out operations on one or more of the respective content, such as content to be processed 14. However, as noted above, content processing component 32 may be an automated process that does not include user terminal 119. For example, in a user-driven case, content processing component 32 may run or have access to a graphical user interface (GUI) generated by a client application. The GUI allows the user to create or modify content 14, as well as initiate the further processing of content 14, such as a file transfer based on operation of similarity identifier component 12 and data reduction component 24.

It should be noted that in FIG. 9, node 132 may not be a destination, but instead may be an alternate network location. In particular, delivery management module 70 may instruct destination node 130 to obtain one or more data components involved in the file transfer from network location 132 if the path between network location 132 and destination node 130 results in optimizing the file transfer, as described above.

Additionally, it should be noted that while workflow/job tracking system 50 is illustrated as being an independent node off of communication network 116, system 50 may be located anywhere within environment 114 or at multiple locations within environment 114. Further, it should be noted that workflow/job tracking system 50 may not exist at all in environment 114.

Optionally, environment 114 may additionally include an intermediate destination 128. For example, intermediate destination 128 may be a perimeter network or a demilitarized zone (DMZ) server. A DMZ server may be used to protect the resources of one network, such as an enterprise LAN, from exposure to another network, such as the public Internet. In another aspect, intermediate server 128 may be a forwarding server, which is server set up by an enterprise to centralize all inbound and outbound file transfers. Although illustrated as being located between source node 120 and communication network 116, such as the Internet, intermediate destination 128 may be located elsewhere, or more than one intermediate destination 128 may be used.

Figure 10:
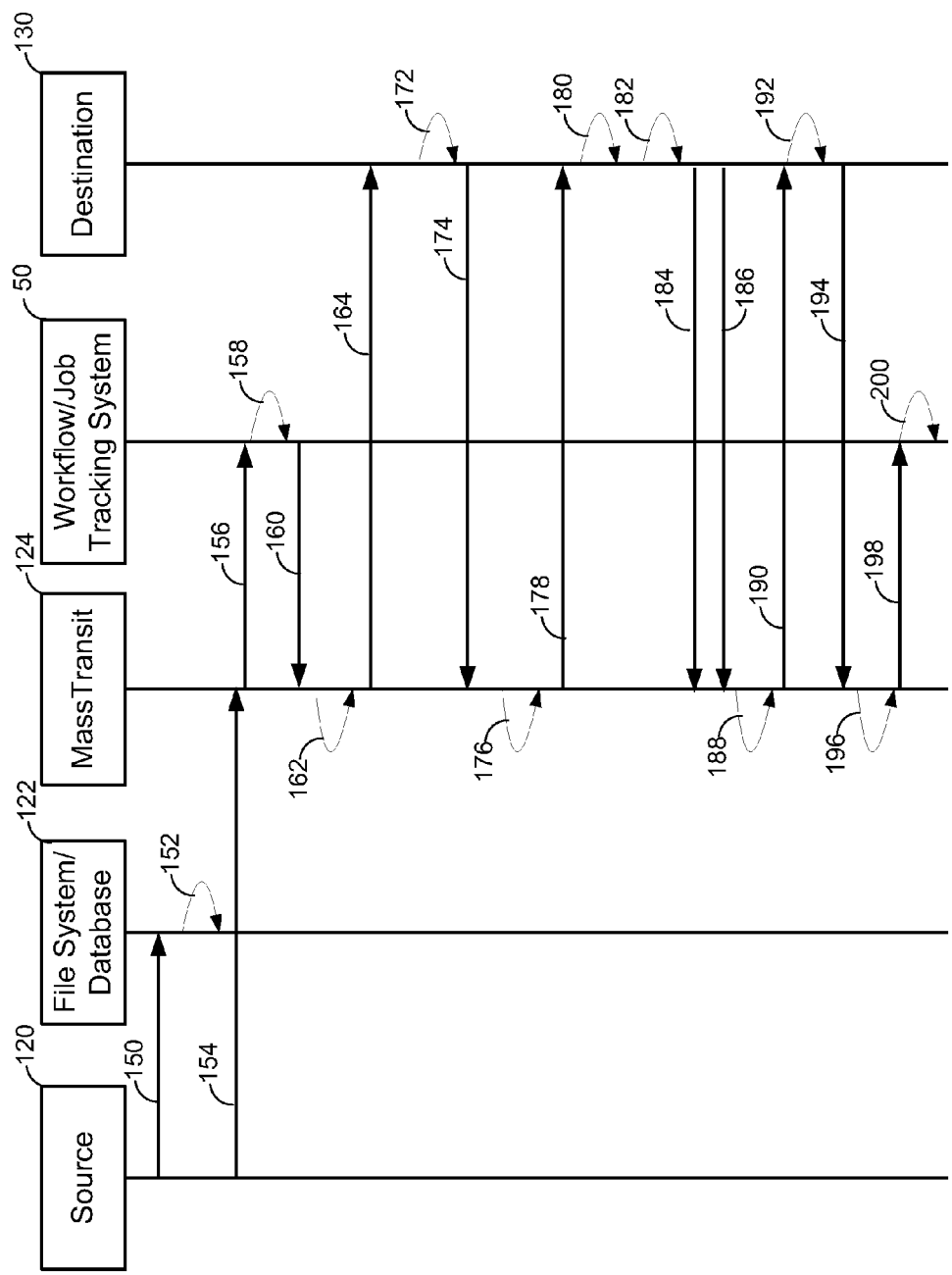
FIG. 10 is an event flow of one aspect of a method of identifying potentially similar content for data reduction.

Referring to FIG. 10, in one example of the operation of such a system, content processing component 32 (FIG. 1) at source node 120 initiates a file transfer at Event 150. The file transfer may be initiated by any one of a variety of actions, including but not limited to copying files to a "hot folder" of a file system/server 122, using a web program or other automated program to queue files, or programmatically kicking off transfers from an automated system. As such, at Event 152, files are copied to the file system/server 122, or are identified in the system at Event 154 as being files to transfer to one or more destination nodes, such as nodes 130 and/or 132 (FIG. 9). For example, at Event 154, computing device 80 (FIG. 9) configured with MASSTRANSIT logic 124 receives a request for performing the file transfer. The request to perform the transfer is the same as, part of, or based on the action of initiating the file transfer in Event 150.

Further, at Event 162, MASSTRANSIT logic 124 obtains the workflow metadata for the files to be transferred. For example, in one aspect, MASSTRANSIT logic 124 obtains the workflow metadata from one or more local data repositories, such the file database or file system 122 of the files to be transferred. In another aspect, referring to Events 156, 158 and 160, MASSTRANSIT logic 124 obtains the workflow metadata from workflow/job tracking system 50. For example, at Event 156, MASSTRANSIT logic 124 sends an identification of the files to be transferred to workflow/job tracking system 50. At Event 158, workflow/job tracking system 50 retrieves the workflow metadata corresponding to the identified files, and forwards the respective workflow metadata to MASSTRANSIT logic 124 at Event 160. Alternately, it should be noted that the workflow metadata may be stored in file system or file database 122 of the respective computing device, such as in one or more databases storing files sent, files received, etc.

At Event 164, MASSTRANSIT logic 124 forwards the workflow metadata for the files to be transferred to destination 130. In an alternate aspect (not depicted), MASSTRANSIT logic 124 forwards the workflow metadata for the files to be transferred to an intermediate destination 128 (FIG. 9), which in turn forwards the information to destination node 130.

At Event 172, a corresponding computing device 80 (FIG. 9) configured with MASSTRANSIT logic 124 at destination node 130 utilizes the received file workflow metadata for the files to be transferred to identify known files 16 (FIG. 9) having a potential similarity with the files to be transferred based on a comparison of respective file workflow metadata. The result of this operation is a set of known files having a potential similarity to a corresponding identified set of files to be transferred, e.g. potentially similar content 22 (FIG. 1). In one aspect, for example, the potentially similar content comprises a subset of the content to be processed, or respective data component thereof, and a corresponding subset of the plurality of known content, or respective data component thereof, having a respective potential similarity. In some aspects, the identified set of known files having the potential similarity includes less than all of the known files available to destination 130. Further, in some aspects, the corresponding identified set of files to be transferred (having potentially similar content to the identified known set of files) includes less than all of the files to be transferred.

At Event 174, destination node 130 sends a request to MASSTRANSIT logic 124 of source node 120 to send a signature, hash, or some other mechanism for determining identical content in data reduction, corresponding to one or more portions of each of the identified potentially similar ones of the set of files to be transferred. At Event 176, MASSTRANSIT logic 124 of source node 120 obtains or computes one or more signatures for each of the potentially similar ones of the files to be transferred, and then transmits each signature to destination node 130 at Event 178. At Event 180, destination 130 obtains or computes one or more signatures for each of the set of known files having a potential similarity based file workflow metadata (as determined at Event 172).

At Event 182, destination node 130 determines whether or not any identical data components exist based on comparing the signatures, hashes, etc., corresponding to the two sets. In one aspect, for example, identification of at least one of a same data component or a different data component between the content to be processed and the plurality of known content is based on execution of a data compression protocol on the potentially similar content by a data reduction component.

At Event 184, if the comparison determines that identical data components exist, then destination node 130 sends MASSTRANSIT logic 124 of source node 120 a message not to include the identical data components in the file transfer. For example, the identical components may be replaced by a token representing one or more of the identical data components.

At Event 186, if the comparison determines that different data components exist, then destination node 130 sends MASSTRANSIT logic 124 of source node 120 a message to include the different data components in the file transfer.

As such, a data size of the file transfer may be substantially reduced by eliminating the need to send data components already known by destination node 130.

Further, at Event 188, MASSTRANSIT logic 124 of source node 120 processes the received messages of Events 184 and 186, and sends the requested files or portions of files, e.g. the different data components and tokens representing known content otherwise referred to as the reduced data representation, to destination node 130.

At Event 192, destination node 130 receives the reduced data representation of the original files for transfer and performs one or more of the operations of updating its database with the received different data components. It should be noted that instead of including the identified different data components, the reduced data component may instead include instructions on obtaining such different data components from another network location, such as alternate location 132 (FIG. 9), having a more efficient path, as discussed above with regard to delivery management component 70 (FIG. 6).

Optionally, at Event 194, destination node 130 may send an acknowledgement message to MASSTRANSIT logic 124 of source node 120 to confirm receipt of or report an error in receiving the reduced data representation. For example, if an error occurred, then MASSTRANSIT logic 124 of source node 120 may attempt to resend all or a part of the reduced data representation.

At Event 196, either based on the transmission of reduced data component from MASSTRANSIT logic 124 of source node 120 or upon receipt of acknowledgement message, MASSTRANSIT logic 124 of source node 120 updates a file database or file server 122 with appropriate file workflow metadata defining the completed file transfer. Alternately, or in addition, at Event 198, MASSTRANSIT logic 124 of source node 120 may inform workflow/job tracking system 50 of the file transfer, thereby allowing workflow/job tracking database 50 to update its records at Event 200.

It should be understood that this is merely one example process flow. Other example flows may occur in different sequences, and different operations may occur at different system components.

Figure 11:
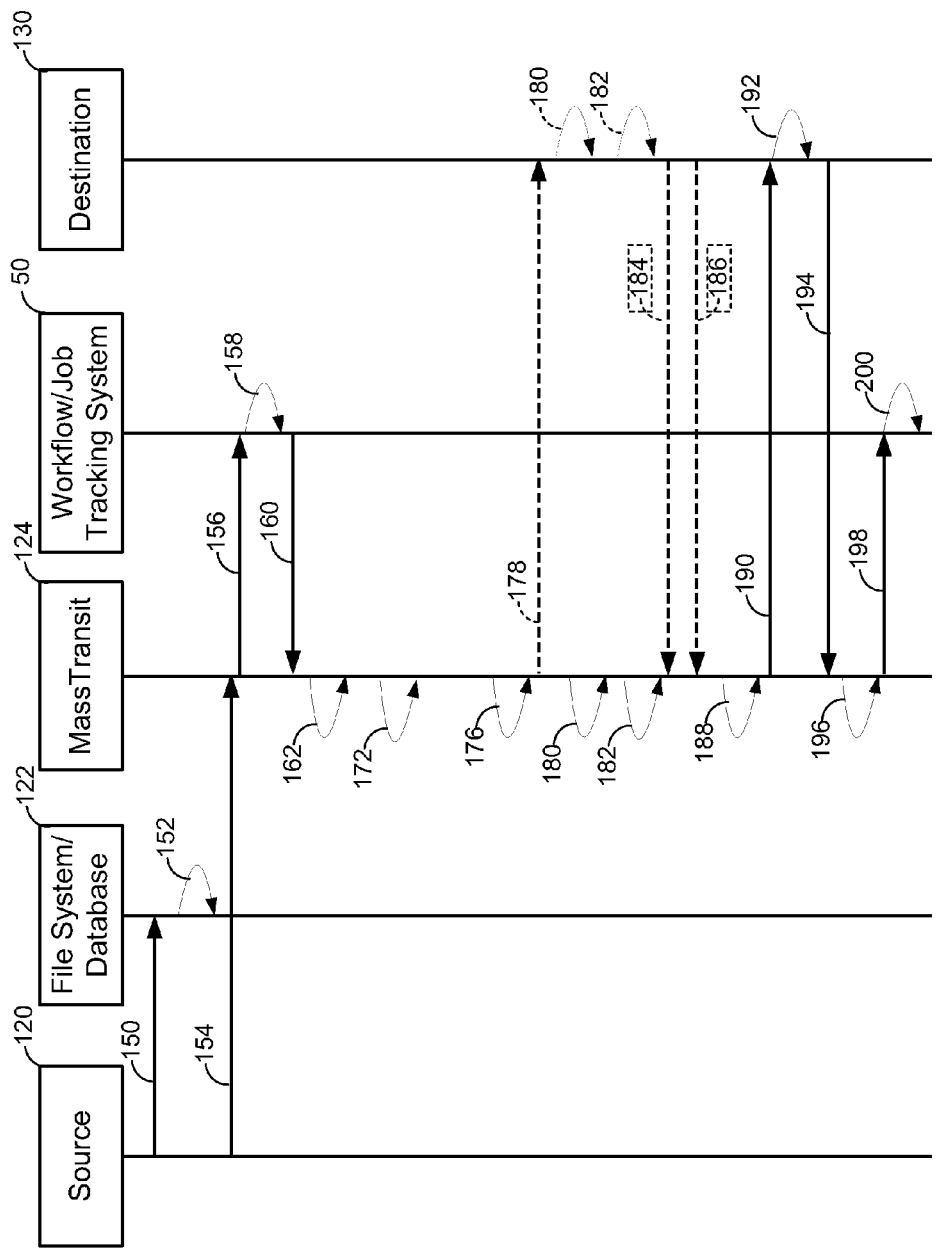
FIG. 11 is an event flow of one aspect of a method of identifying potentially similar content for data reduction.

For example, in one alternative, referring to FIG. 11, the determination of potential similarity (e.g. Event 172) may occur on the sending-side of the file transfer, e.g. at source node 120, resulting in the sending-side requesting signatures, hashes, etc., of the potentially similar known files from the destination node or from some other network location identified by similarity identifier component as having the potentially similar known files. For example, MASSTRANSIT logic 124 of source node 120 may consult one or more file servers or file databases 122, which may include, for example, workflow processing metadata 44 of files previously transferred and/or previously received, for comparison with the workflow processing metadata of the files to be transferred. Subsequently, in one aspect, the determination of identical data components (e.g. Events 180 and 182) may then be made at the sending-side, e.g. at source node 120. Alternatively, the determination of identical data components may be performed at destination node 130, as illustrated by dashed Events 178, 180, 182, 184 and 186. In any case, the processing results in the transfer of the reduced data representation to one or more destination nodes.

Further, in other alternatives, it should be understood that intermediate destination 128 (FIG. 9) may be involved in all communications between MASSTRANSIT logic 124 of any node, such as source node 120 and/or destination node 130 and/or 132 and any other network connection, such as any connection to a respective destination node 130 and/or workflow/job tracking system 50.

Additionally, it should be understood that the functional operations may be performed at one computing device or distributed across any number of computing devices in communication with the system.

In one more example of a use case involving a file transfer, which should not be construed as limiting, the content to be processed may be content corresponding to an issue of a magazine for a given month. For example, the content to be processed may be thousands of digital files, such as digital files relating to one or more of an Adobe InDesign layout, photographs, advertisements, fonts, and any other data component of the given issue of the respective magazine. The corresponding workflow metadata for the content may include, for example, information describing the content and/or describing the workflow processing of the content. In this case, the known content may be a prior issue of the magazine or another language version of the magazine, or both, each having corresponding known content workflow metadata. As such, according to the apparatus and methods described herein, based on matching the workflow metadata to identify a similarity based on the respective magazine, the entire plurality of known content can be narrowed down to the known content corresponding to the prior issue of the magazine or the other language version, or both, of the magazine. For example, this may reduce the known content from millions of digital files down to thousands of digital files associated with the prior issue of the magazine or the other language version, or both, of the magazine. Further, the thousands of content to be processed may be narrowed down to a smaller subset based on the matching of the workflow metadata. As a result, the data reduction operations can be more efficiently performed, or can become feasible, by allowing the data reduction to be performed on this reduced set of content to be processed and known content identified as having potentially similar content based on workflow metadata.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A computer-implemented method of identifying potentially similar content for data reduction, comprising:
receiving content workflow metadata corresponding to content to be processed, wherein the content to be processed includes a data component, and wherein the content workflow metadata comprises a workflow processing characteristic of the data component;
wherein the content workflow metadata corresponding to the content to be processed further comprises a plurality of content workflow metadata corresponding to a plurality of content to be processed, wherein each of the plurality of content to be processed includes a respective data component, and wherein each respective content workflow metadata comprises a respective workflow processing characteristic corresponding to a respective data component;
receiving known content workflow metadata corresponding to a plurality of known content, wherein each known content includes a known data component, and wherein each known content workflow metadata comprises a workflow processing characteristic of the corresponding known data component;
comparing the content workflow metadata of the content to be processed and the known content workflow metadata of the plurality of known content according to a similarity rule to identify a first subset of the plurality of known content having potentially similar content relative to the content to be processed;
identifying a first subset of the plurality of content to be processed based on determining a potential similarity between respective data components based on the respective content workflow metadata; and
outputting an identification of the first subset of the plurality of known content and the first subset of the plurality of content to be processed to use in reducing data in the content to be processed;
wherein each workflow processing characteristic relates to a workflow process applicable to the corresponding content; and
wherein the similarity rule comprises a workflow-specific similarity rule, wherein the workflow-specific similarity rule depends on a type of the workflow associated with the content to be processed.

2. The method of claim 1, wherein receiving content workflow metadata further comprises obtaining the content workflow metadata from a system comprising a plurality of content workflow metadata corresponding to a plurality of workflow content, wherein the content to be processed comprises one of the plurality of workflow content.

3. The method of claim 1, further comprising: identifying a second subset of the plurality of known content, and wherein the second subset of the plurality of known content is not equal to the first subset of the plurality of known content;

performing a data compression technique on the first subset of the plurality of content to be processed and the second subset of the plurality of known content to identify a reduced data representation of the content to be processed; and wherein outputting comprises outputting an identification of the reduced data representation.

4. The method of claim 3, further comprising transmitting or receiving the reduced data representation.

5. The method of claim 3, further comprising replacing a duplicate data component in the content to be processed with a token to form the reduced data representation.

6. The method of claim 3, wherein performing the data compression technique comprises identifying a same data component in both the first subset of the plurality of content to be processed and the second subset of the plurality of known content.

7. The method of claim 1, further comprising:
determining a data component difference between the content to be processed and the first subset of the plurality of known content;
determining a network storage location of each of a plurality of network-based content having the data component difference;
determining a network destination location for receiving a transmission of the data component difference;
determining a delivery efficiency between each network storage location and the network destination location; and causing transmission of the data component difference to the network destination location from the respective network storage location having a most efficient one of the determined delivery efficiencies.

8. The method of claim 1, further comprising:
identifying at least one of a same data component or a different data component between the first subset of the plurality of content to be processed and one of the first subset of the plurality of known content; and
wherein the outputting further comprises outputting an identification of at least one of the same data component or the different data component.

9. The method of claim 8, further comprising transmitting or receiving the different data component based on the identification of at least one of the same data component or the different data component.

10. The method of claim 8, further comprising replacing the same data component in the content to be processed with a token based on the identification of at least one of the same data component or the different data component.

11. The method of claim 1, further comprising:
transmitting the identification of the first subset of the plurality of known content to a data reduction component;
receiving from the data reduction component an identification of at least one of a same data component or a different data component between the content to be processed and the first subset of the plurality of known content based on execution of a data compression protocol; and
transmitting a reduced data representation of the content to be processed to a file transfer destination based on the identification of the at least one of a same data component or a different data component.

12. The method of claim 11, further comprising identifying a second subset of the plurality of content to be processed that corresponds to the first subset of the plurality of known content according to the similarity rule, wherein the transmitting further comprises transmitting a respective data reduction signature of one or more portions of each of the second subset of the plurality of content to be processed or transmitting an identification of the first subset of the plurality of known content.

13. The method of claim 12, wherein the receiving of the identification of at least one of a same data component or a different data component is further based on the data reduction component generating a respective data reduction signature of one or more portions of each of the first subset of the plurality of known content, and comparing the respective data reduction signatures to determine the same data component.

14. The method of claim 11, wherein transmitting the reduced data representation of the content to be processed further comprises transmitting one or more different data components and one or more tokens representing a respective one or more same data components.

15. The method of claim 1, further comprising:
obtaining a reduced data representation of the content to be processed based on the first subset of the plurality of known content;
processing the reduced data representation; and
updating the content workflow metadata corresponding to the content to be processed with information describing the processing.

16. The method of claim 1, wherein receiving known content workflow metadata corresponding to the plurality of known content further comprises receiving known content workflow metadata corresponding to at least one of: a plurality of previously-transferred content; or a plurality of previously-received content; or the plurality of content to be processed.

17. The method of claim 1, further comprising:
identifying a proper subset of the plurality of content to be processed based on performing a data compression technique on the first subset of the plurality of content to be processed;
identifying a second subset of the plurality of known content that represent content potentially similar to the proper subset of the plurality of content to be processed based on comparing a respective data component of a respective one of the proper subset of the plurality of content to be processed and a respective known data component of a respective one of the first subset of the plurality of known content according to the similarity rule, wherein the second subset of the plurality of known content is a proper subset of the first subset of the plurality of known content;
performing a data compression technique on the proper subset of the plurality of content to be processed and the second subset of the plurality of known content to identify a reduced data representation of the plurality of content to be processed; and
wherein outputting comprises outputting the reduced data representation.

18. The method of claim 1, wherein receiving the content workflow metadata corresponding to the content to be processed further comprises receiving at a destination from a source located across a communication network, wherein the comparing further comprises comparing at the destination, and wherein outputting the identification of the first subset of the plurality of known content further comprises transmitting from the destination to the source.

19. A computer program product configured to identify potentially similar content for data reduction, comprising:
a computer-readable medium comprising:
at least one set of instructions operable to cause a computer to receive content workflow metadata corresponding to content to be processed, wherein the content to be processed includes a data component, and wherein the content workflow metadata comprises a workflow processing characteristic of the data component;

wherein the content workflow metadata corresponding to the content to be processed further comprises a plurality of content workflow metadata corresponding to a plurality of content to be processed, wherein each of the plurality of content to be processed includes a respective data component, and wherein each respective content workflow metadata comprises a respective workflow processing characteristic corresponding to a respective data component, at least one set of instructions operable to cause the computer to receive known content workflow metadata corresponding to a plurality of known contents, wherein each known content includes a known data component, and wherein each known content workflow metadata comprises a workflow processing characteristic of the corresponding known data component;

at least one set of instructions operable to cause the computer to compare the content workflow metadata of the content to be processed and the known content workflow metadata of the plurality of known content according to a similarity rule to identify a first subset of the plurality of known content having potentially similar content relative to the content to be processed;

at least one set of instructions operable to cause the computer to identify a first subset of the plurality of content to be processed based on determining a potential similarity between respective data components based on the respective content workflow metadata; and at least one set of instructions operable to cause the computer to output an identification of the first subset of the plurality of known content and the first subset of the plurality of content to be processed to use in reducing data in the content to be processed;

wherein each workflow processing characteristic relates to a workflow process applicable to the corresponding content; and wherein the similarity rule comprises a workflow-specific similarity rule, wherein the workflow-specific similarity rule depends on a type of the workflow associated with the content to be processed.

20. At least one processor configured to identify potentially similar content for data reduction, comprising:

a first hardware module for receiving content workflow metadata corresponding to content to be processed, wherein the content to be processed includes a data component, and wherein the content workflow metadata comprises a workflow processing characteristic of the data component;

wherein the content workflow metadata corresponding to the content to be processed further comprises a plurality of content workflow metadata corresponding to a plurality of content to be processed, wherein each of the plurality of content to be processed includes a respective data component, and wherein each respective content workflow metadata comprises a respective workflow processing characteristic corresponding to a respective data component;

a second module for receiving known content workflow metadata corresponding to a plurality of known contents, wherein each known content workflow metadata comprises a workflow processing characteristic of the corresponding known data component;

a third module for comparing the content workflow metadata of the content to be processed and the known content workflow metadata of the plurality of known content according to a similarity rule to identify a first subset of the plurality of known content having potentially similar content relative to the content to be processed;

a fourth module for identifying a first subset of the plurality of content to be processed based on determining a potential similarity between respective data components based on the respective content workflow metadata; and a fifth module for outputting an identification of the first subset of the plurality of known content and the first subset of the plurality of content to be processed to use in reducing data in the content to be processed;

wherein each workflow processing characteristic relates to a workflow process applicable to the corresponding content; and wherein the similarity rule comprises a workflow-specific similarity rule, wherein the workflow-specific similarity rule depends on a type of the workflow associated with the content to be processed.

21. A computing device for identifying potentially similar content for data reduction, comprising:

means for receiving content workflow metadata corresponding to content to be processed, wherein the content to be processed includes a data component, and wherein the content workflow metadata comprises a workflow processing characteristic of the data component;

wherein the content workflow metadata corresponding to the content to be processed further comprises a plurality of content workflow metadata corresponding to a plurality of content to be processed, wherein each of the plurality of content to be processed includes a respective data component, and wherein each respective content workflow metadata comprises a respective workflow processing characteristic corresponding to a respective data component;

means for receiving known content workflow metadata corresponding to a plurality of known contents, wherein each known content includes a known data component, and wherein each known content workflow metadata comprises a workflow processing characteristic of the corresponding known data component;

means for comparing the content workflow metadata of the content to be processed and the known content workflow metadata of the plurality of known content according to a similarity rule to identify a first subset of the plurality of known content having potentially similar content relative to the content to be processed;

means for identifying a first subset of the plurality of content to be processed based on determining a potential similarity between respective data components based on the respective content workflow metadata; and means for outputting an identification of the first subset of the plurality of known content and the first subset of the plurality of content to be processed to use in reducing data in the content to be processed;

wherein each workflow processing characteristic relates to a workflow process applicable to the corresponding content; and wherein the similarity rule comprises a workflow-specific similarity rule, wherein the workflow-specific similarity rule depends on a type of the workflow associated with the content to be processed.

22. A computing device for identifying potentially similar content for data reduction, comprising:
- a communications hardware module operable to receive content workflow metadata corresponding to content to be processed, wherein the content to be processed includes a data component, and wherein the content workflow metadata comprises a workflow processing characteristic of the data component;
- wherein the content workflow metadata corresponding to the content to be processed further comprises a plurality of content workflow metadata corresponding to a plurality of content to be processed, wherein each of the plurality of content to be processed includes a respective data component, and wherein each respective content workflow metadata comprises a respective workflow processing characteristic corresponding to a respective data component;
- wherein the communications module is further operable to receive known content workflow metadata corresponding to a plurality of known content, wherein each known content includes a known data component, and wherein each known content workflow metadata comprises a workflow processing characteristic of the corresponding known data component;
- a similarity identifier module having one or more similarity rules operable to compare the content workflow metadata of the content to be processed and the known content workflow metadata of the plurality of known content according to a similarity rule to identify a first subset of the plurality of known content having potentially similar content relative to the content to be processed;
- wherein the similarity identifier component is further operable to identify a first subset of the plurality of content to be processed based on determining a potential similarity between respective data components based on the respective content workflow metadata; and
- wherein the similarity identifier component is further operable to output an identification of the first subset of the plurality of known content and the first subset of the plurality of content to be processed to use in reducing data in the content to be processed;
- wherein each workflow processing characteristic relates to a workflow process applicable to the corresponding content; and
- wherein the similarity rule comprises a workflow-specific similarity rule, wherein the workflow-specific similarity rule depends on a type of the workflow associated with the content to be processed.

23. The computing device of claim 22, wherein the communications module is further operable to obtain the content workflow metadata from a system comprising a plurality of content workflow metadata corresponding to a plurality of workflow content, wherein the content to be processed comprises one of the plurality of workflow content.

24. The computing device of claim 22, further comprising:
- wherein the similarity identifier component is further operable to identify a second subset of the plurality of known content, and wherein the second subset of the plurality of known content is not equal to the first subset of the plurality of known content;
- a data reduction component having a data compression protocol operable to compress the first subset of the plurality of content to be processed and the second subset of the plurality of known content to identify a reduced data representation of the content to be processed; and
- wherein outputting comprises outputting an identification of the reduced data representation.

25. The computing device of claim 24, wherein the communications module is further operable to transmit or receive the reduced data representation.

26. The computing device of claim 24, wherein the data reduction component is further operable to replace a duplicate data component in the content to be processed with a token to form the reduced data representation.

27. The computing device of claim 24, wherein the data reduction component is further operable to identify a same data component in both the first subset of the plurality of content to be processed and the second subset of the plurality of known content.

28. The computing device of claim 22, further comprising:
- a data reduction component having a data compression protocol operable to determine a data component difference between the content to be processed and the first subset of the plurality of known content;
- a delivery management component having a data location identifier operable to determine a network storage location of each of a plurality of network-based content having the data component difference;
- a content processing component operable to determine a network destination location for receiving a transmission of the data component difference;
- wherein the delivery management component further comprises a delivery optimizer operable to determine a delivery efficiency between each network storage location and the network destination location; and
- wherein the delivery management component is further operable to cause transmission of the data component difference to the network destination location from the respective network storage location having a most efficient one of the determined delivery efficiencies.

29. The computing device of claim 22, further comprising:
- a data reduction component having a data compression protocol operable to identify at least one of a same data component or a different data component between the first subset of the content to be processed and one of the first subset of the plurality of known content; and
- wherein the data reduction component is further operable to output an identification of at least one of the same data component or the different data component.

30. The computing device of claim 29, wherein the communications module is further operable to transmit or receive the different data component based on the identification of at least one of the same data component or the different data component.

31. The computing device of claim 29, wherein the data reduction component is further operable to replace the same data component in the content to be processed with a token based on the identification of at least one of the same data component or the different data component.

32. The computing device of claim 22, further comprising:
- wherein the similarity identifier component is further operable to transmit the identification of the first subset of the plurality of known content to a data reduction component;
- a content processing component operable to receive from the data reduction component an identification of at least one of a same data component or a different data component between the content to be processed and the first subset of the plurality of known content based on execution of a data compression protocol; and
- wherein the content processing component is further operable to initiate transmission of a reduced data representation of the content to be processed to a file transfer destination based on the identification of the at least one of a same data component or a different data component.

33. The computing device of claim 32, further comprising identifying a second subset of the plurality of the content to be processed that corresponds to the first subset of the plurality of known content according to the similarity rule, wherein the content processing component is further operable to initiate transmission of a respective data reduction signature of one or more portions of each of the second subset of the plurality of the content to be processed or transmitting an identification of the subset of the plurality of known content.

34. The computing device of claim 33, wherein the identification of at least one of a same data component or a different data component is further based on the data reduction component generating a respective data reduction signature of one or more portions of each of the first subset of the plurality of known content, and comparing the respective data reduction signatures to determine the same data component.

35. The computing device of claim 32, wherein the reduced data representation of the content to be processed further comprises one or more different data components and one or more tokens representing a respective one or more same data components.

36. The computing device of claim 22, further comprising:
wherein the communications module is further operable to obtain a reduced data representation of the content to be processed based on the first subset of the plurality of known content;
a content processing component operable to process the reduced data representation; and
wherein the content processing component is further operable to update the content workflow metadata corresponding to the content to be processed with information describing the processing.

37. The computing device of claim 22, wherein the known content workflow metadata corresponding to the plurality of known content further comprises known content workflow metadata corresponding to at least one of: a plurality of previously-transferred content; or a plurality of previously-received content; or the plurality of content to be processed.

38. The computing device of claim 22, further comprising:
a data reduction component having a data compression protocol operable to identify a proper subset of the plurality of content to be processed based on performing a data compression technique on the first subset of the plurality of content to be processed;
wherein the similarity identifier component is further operable to identify a second subset of the plurality of known content that represent content potentially similar to the proper subset of the plurality of content to be processed based on comparing a respective data component of a respective one of the proper subset of the plurality of content to be processed and a respective known data component of a respective one of the first subset of the plurality of known content according to the similarity rule, wherein the second subset of the plurality of known content is a proper subset of the first subset of the plurality of known content;
wherein the data reduction component is further operable to execute the data compression protocol on the proper subset of the plurality of content to be processed and the second subset of the plurality of known content to identify a reduced data representation of the plurality of content to be processed; and
wherein the data reduction component is further operable to output the reduced data representation.

39. The computing device of claim 22, wherein the computing device is located at a destination on a communications network, wherein the communications module is further operable to receive the content workflow metadata corresponding to the content to be processed from a source located across the communications network from the destination, and wherein the similarity identifier component is further operable to transmit the identification of first subset of the plurality of known content from the destination to the source.

40. A computer-implemented method of identifying potentially similar content for data reduction, comprising:
receiving content workflow metadata corresponding to content to be processed, wherein the content to be processed includes a data component, and wherein the content workflow metadata represents workflow processing information corresponding to the data component;
receiving known content workflow metadata corresponding to a first plurality of known content, wherein each known content includes a known data component, and wherein the known content workflow metadata represents workflow processing information corresponding to each respective known data component;
determining a potential similarity between the data component of the content to be processed and at least one known data component of at least one of the first plurality of known content based on a similarity between the respective content workflow metadata and the respective known content workflow metadata;
outputting an identification of potentially similar content, based on the determined potential similarity, for use in reducing data in the content to be processed;
wherein receiving content workflow metadata corresponding to a content to be processed further comprises receiving a plurality of content workflow metadata corresponding to a plurality of content to be processed, wherein each of the plurality of content to be processed includes a respective data component, and wherein each respective content workflow metadata represents workflow processing information corresponding to a respective data component;
identifying potentially similar ones of the plurality of content to be processed based on determining a potential similarity between respective data components based on the respective content workflow metadata;
identifying a proper subset of the plurality of content to be processed based on performing a data compression technique on the identified potentially similar ones of the plurality of content to be processed;
wherein determining the potential similarity with the first plurality of known content further comprise determining a potential similarity between a respective data component of a respective one of the proper subset of the plurality of content to be processed and a respective known data component of a respective one of the first plurality of known content based on a similarity between the respective content workflow metadata and the respective known content metadata;
identifying a second plurality of known content that represent content potentially similar to the proper subset of the plurality of content to be processed based on the determined potential similarity, wherein the second plurality of known content is a proper subset of the first plurality of known content;
performing a data compression technique on the proper subset of the plurality of content to be processed and the second plurality of known content to identify a reduced data representation of the plurality of content to be processed; and wherein outputting comprises outputting the reduced data representation.

41. A computer program product configured to identify potentially similar content for data reduction, comprising:
a computer-readable medium comprising:
at least one set of instructions operable to cause a computer to receive content workflow metadata corresponding to content to be processed, wherein the content to be processed includes a data component, and wherein the content workflow metadata represents workflow processing information corresponding to the data component;
at least one set of instructions operable to cause the computer to receive known content workflow metadata corresponding to a first plurality of known contents, wherein each known content includes a known data component, and wherein the known content workflow metadata represents workflow processing information corresponding to each respective known data component;
at least one set of instructions operable to cause the computer to determine a potential similarity between the data component of the content to be processed and at least one known data component of at least one of the first plurality of known contents based on a potential similarity between the respective content workflow metadata and the respective known content workflow metadata; and
at least one set of instructions operable to cause the computer to output an identification of potentially similar content, based on the determined potential similarity, for use in reducing data in the content to be processed
wherein receiving content workflow metadata corresponding to a content to be processed further comprises receiving a plurality of content workflow metadata corresponding to a plurality of content to be processed, wherein each of the plurality of content to be processed includes a respective data component, and wherein each respective content workflow metadata represents workflow processing information corresponding to a respective data component;
identifying potentially similar ones of the plurality of content to be processed based on determining a potential similarity between respective data components based on the respective content workflow metadata;
identifying a proper subset of the plurality of content to be processed based on performing a data compression technique on the identified potentially similar ones of the plurality of content to be processed;
wherein determining the potential similarity with the first plurality of known content further comprise determining a potential similarity between a respective data component of a respective one of the proper subset of the plurality of content to be processed and a respective known data component of a respective one of the first plurality of known content based on a similarity between the respective content workflow metadata and the respective known content metadata;
identifying a second plurality of known content that represent content potentially similar to the proper subset of the plurality of content to be processed based on the determined potential similarity, wherein the second plurality of known content is a proper subset of the first plurality of known content;

performing a data compression technique on the proper subset of the plurality of content to be processed and the second plurality of known content to identify a reduced data representation of the plurality of content to be processed; and wherein outputting comprises outputting the reduced data representation.

42. At least one processor configured to identify potentially similar content for data reduction, comprising:
a first hardware module for receiving content workflow metadata corresponding to content to be processed, wherein the content to be processed includes a data component, and wherein the content workflow metadata represents workflow processing information corresponding to the data component;
a second module for receiving known content workflow metadata corresponding to a first plurality of known contents, wherein each known content includes a known data component, and wherein the known content workflow metadata represents workflow processing information corresponding to each respective known data component;
a third module for determining a potential similarity between the data component of the content to be processed and at least one known data component of at least one of the first plurality of known contents based on a potential similarity between the respective content workflow metadata and the respective known content workflow metadata; and
a fourth module for outputting an identification of potentially similar content, based on the determined potential similarity, for use in reducing data in the content to be processed
wherein receiving content workflow metadata corresponding to a content to be processed further comprises receiving a plurality of content workflow metadata corresponding to a plurality of content to be processed, wherein each of the plurality of content to be processed includes a respective data component, and wherein each respective content workflow metadata represents workflow processing information corresponding to a respective data component;
identifying potentially similar ones of the plurality of content to be processed based on determining a potential similarity between respective data components based on the respective content workflow metadata;
identifying a proper subset of the plurality of content to be processed based on performing a data compression technique on the identified potentially similar ones of the plurality of content to be processed;
wherein determining the potential similarity with the first plurality of known content further comprise determining a potential similarity between a respective data component of a respective one of the proper subset of the plurality of content to be processed and a respective known data component of a respective one of the first plurality of known content based on a similarity between the respective content workflow metadata and the respective known content metadata;
identifying a second plurality of known content that represent content potentially similar to the proper subset of the plurality of content to be processed based on the determined potential similarity, wherein the second plurality of known content is a proper subset of the first plurality of known content;
performing a data compression technique on the proper subset of the plurality of content to be processed and the second plurality of known content to identify a reduced data representation of the plurality of content to be processed; and wherein outputting comprises outputting the reduced data representation.

43. A computing device for identifying potentially similar content for data reduction, comprising:
means for receiving content workflow metadata corresponding to content to be processed, wherein the content to be processed includes a data component, and wherein the content workflow metadata represents workflow processing information corresponding to the data component;
means for receiving known content workflow metadata corresponding to a first plurality of known contents, wherein each known content includes a known data component, and wherein the known content workflow metadata represents workflow processing information corresponding to each respective known data component;
means for determining a potential similarity between the data component of the content to be processed and at least one known data component of at least one of the first plurality of known contents based on a potential similarity between the respective content workflow metadata and the respective known content workflow metadata; and
means for outputting an identification of potentially similar content, based on the determined potential similarity, for use in reducing data in the content to be processed
wherein receiving content workflow metadata corresponding to a content to be processed further comprises receiving a plurality of content workflow metadata corresponding to a plurality of content to be processed, wherein each of the plurality of content to be processed includes a respective data component, and wherein each respective content workflow metadata represents workflow processing information corresponding to a respective data component;
identifying potentially similar ones of the plurality of content to be processed based on determining a potential similarity between respective data components based on the respective content workflow metadata;
identifying a proper subset of the plurality of content to be processed based on performing a data compression technique on the identified potentially similar ones of the plurality of content to be processed;
wherein determining the potential similarity with the first plurality of known content further comprise determining a potential similarity between a respective data component of a respective one of the proper subset of the plurality of content to be processed and a respective known data component of a respective one of the first plurality of known content based on a similarity between the respective content workflow metadata and the respective known content metadata;
identifying a second plurality of known content that represent content potentially similar to the proper subset of the plurality of content to be processed based on the determined potential similarity, wherein the second plurality of known content is a proper subset of the first plurality of known content;
performing a data compression technique on the proper subset of the plurality of content to be processed and the second plurality of known content to identify a reduced data representation of the plurality of content to be processed; and wherein outputting comprises outputting the reduced data representation.

44. A computing device for identifying potentially similar content for data reduction, comprising:
a communications hardware module operable to receive content workflow metadata corresponding to content to be processed, wherein the content to be processed includes a data component, and wherein the content workflow metadata represents workflow processing information corresponding to the data component;
wherein the communications module is further operable to receive known content workflow metadata corresponding to a first plurality of known content, wherein each known content includes a known data component, and wherein the known content workflow metadata represents workflow processing information corresponding to each respective known data component;
a similarity identifier module having one or more similarity rules operable to determine a potential similarity between the data component of the content to be processed and at least one known data component of at least one of the first plurality of known content based on a potential similarity between the respective content workflow metadata and the respective known content workflow metadata;
wherein the similarity identifier component is further operable to output an identification of potentially similar content, based on the determined potential similarity, for use in reducing data in the content to be processed;
wherein the content workflow metadata corresponding to the content to be processed further comprises a plurality of content workflow metadata corresponding to a plurality of content to be processed, wherein each of the plurality of contents to be processed includes a respective data component, and wherein each respective content workflow metadata represents workflow processing information corresponding to a respective data component;
wherein the similarity identifier component is further operable to identify potentially similar ones of the plurality of content to be processed based on determining a potential similarity between respective data components based on the respective content workflow metadata;
a data reduction component having a data compression protocol operable to identify a proper subset of the plurality of content to be processed based on performing a data compression technique on the identified potentially similar ones of the plurality of content to be processed;
wherein the similarity identifier component is further operable to determine a potential similarity between a respective data component of a respective one of the proper subset of the plurality of content to be processed and a respective known data component of a respective one of the first plurality of known content based on a similarity between the respective content workflow metadata and the respective known content metadata;
wherein the similarity identifier component is further operable to identify a second plurality of known content that represent content potentially similar to the proper subset of the plurality of contents to be processed based on the determined potential similarity, wherein the second plurality of known content is a proper subset of the first plurality of known content;

wherein the data reduction component is further operable to execute the data compression protocol on the proper subset of the plurality of content to be processed and the second plurality of known content to identify a reduced data representation of the plurality of content to be processed; and wherein the data reduction component is further operable to output the reduced data representation.

* * * * *